US012300924B2

(12) United States Patent
Bae et al.

(10) Patent No.: US 12,300,924 B2
(45) Date of Patent: May 13, 2025

(54) PORT BLOCKING MODULE FOR ELECTRONIC DEVICE AND PORT LOCKING APPARATUS COMPRISING SAME

(71) Applicant: COMXI Co., Ltd., Seoul (KR)

(72) Inventors: Byong Ju Bae, Asan-si (KR); Yong Un Choi, Cheonan-si (KR); Chang Hoon Ahn, Uiwang-si (KR)

(73) Assignee: COMXI Co., Ltd., Seoul (KR)

( * ) Notice: Subject to any disclaimer, the term of this patent is extended or adjusted under 35 U.S.C. 154(b) by 321 days.

(21) Appl. No.: 18/094,207

(22) Filed: Jan. 6, 2023

(65) Prior Publication Data

US 2023/0155313 A1 May 18, 2023

Related U.S. Application Data

(63) Continuation of application No. PCT/KR2021/008348, filed on Jul. 1, 2021.

(30) Foreign Application Priority Data

Jul. 17, 2020 (KR) ........................ 10-2020-0089052

(51) Int. Cl.
*H01R 13/443* (2006.01)
*H01R 13/645* (2006.01)

(52) U.S. Cl.
CPC ......... *H01R 13/443* (2013.01); *H01R 13/645* (2013.01)

(58) Field of Classification Search
CPC ... H01R 13/645; H01R 13/443; H05K 7/1409
See application file for complete search history.

(56) References Cited

U.S. PATENT DOCUMENTS 7,465,181 B1 * 12/2008 Bridges .............. H01R 13/6392 439/133
10,624,222 B2 * 4/2020 Ahn ..................... H05K 5/0208
2020/0015374 A1 * 1/2020 Ahn .......................... H05K 5/03

FOREIGN PATENT DOCUMENTS

KR 10-1406202 B1 6/2014
KR 10-1768190 B1 8/2017
KR 10-1865165 B1 6/2018
KR 10-1961922 B1 7/2019
(Continued)

*Primary Examiner* — Tulsidas C Patel
*Assistant Examiner* — Carlos E Lopez-Pagan
(74) *Attorney, Agent, or Firm* — United One Law Group LLC; Kongsik Kim; Jhongwoo Peck

(57) ABSTRACT

A port blocking module of an electronic device and a port locking apparatus having the same includes a module frame which is formed to correspond to size and shape of a port of an electronic device, a locking module having a locking module body fixedly installed inside the module frame, a first locking member connected to the locking module body to be elastically transformable such that the first locking member selectively comes into contact with a terminal part inside the port, and a second locking member connected to the locking module body to be elastically transformable such that the second locking member is disposed by being spaced apart from the first locking member, and a pattern module which is installed to be movable between a locking position and an unlocking position inside and outside the module frame.

9 Claims, 31 Drawing Sheets

(56) References Cited

FOREIGN PATENT DOCUMENTS

| | | | |
|---|---|---|---|
| KR | 10-2016580 | B1 | 8/2019 |
| KR | 10-2062845 | B1 | 1/2020 |

* cited by examiner

I—I

Ⅱ－Ⅱ

Ⅲ—Ⅲ

V—V

VI—VI

VII—VII

PORT BLOCKING MODULE FOR ELECTRONIC DEVICE AND PORT LOCKING APPARATUS COMPRISING SAME

CROSS-REFERENCE TO RELATED APPLICATIONS

The present application is a Continuation of PCT/KR2021/008348 filed on Jul. 1, 2021, which claims priority from Korean Application No. 10-2020-0089052 filed on Jul. 17, 2020. The aforementioned applications are incorporated herein by reference in their entireties.

TECHNICAL FIELD

The present disclosure relates generally to a port blocking module for an electronic device. More particularly, the present disclosure relates to a port blocking module for physically blocking a port which is provided in the electronic device such that an external device can be connected to the port, and a PORT LOCKING APPARATUS having the same.

RELATED ART

Recently, incidents in which outsiders or non-administrators infiltrate financial institutions or government-affiliated institutions to withdraw data stored in computers have occurred, which caused a great social impact. In preparation for this, various countermeasures have been proposed.

Considering this point, recently, various technologies have been proposed to physically block a USB port of a computer, network equipment, and electronic products so as to prevent the connection of unauthorized data transmission cables or connectors thereto.

In addition, various methods and devices for physically blocking a LAN port, that is, a network port to which a LAN cable is connected so as to block data withdrawal through the network port have been proposed.

To this end, the present applicant has developed a device for locking a USB port, a device for locking a LAN port, and a device for locking a network port lock, etc.

Meanwhile, a lock device for physically blocking a port of an electronic device includes a locking member inserted into a port to directly block the port, and a key member used to take out the locking member from the port. Here, the key member is inserted into a key groove of the locking member and unlock the locking member to take out the locking member from the port, and includes a pattern key corresponding to a pattern groove formed inside the key groove. However, since the pattern key and the pattern groove are designed and manufactured for each lock device, the locking member can be separated from the port only by using the key member having the pattern key matching the pattern groove of the locking member.

That is, the locking member can be separated from the port by pulling the pattern key after simply inserting the pattern key into the key groove of the locking member such that the pattern key is held in the pattern groove. However, in this case, even if patterns of the pattern groove and the pattern key do not match each other, the locking member may be forcibly removed from the port by allowing a part of the pattern key to be partially held in the pattern groove inside the key groove.

Accordingly, in consideration of this, development of a lock device which can lock the port of an electronic device more reliably is required.

SUMMARY

The present disclosure has been made keeping in mind the above problems occurring in the prior art and is intended to propose a port blocking module of an electronic device which securely can lock a port of an electronic device, and port locking apparatus having the same.

In order to accomplish the above objective, the present disclosure provides a port blocking module of an electronic device, the port blocking module including: a module frame which is formed to correspond to size and shape of a port of an electronic device and has a shape of a frame having opposite open ends; a locking module having a locking module body fixedly installed inside the module frame, a first locking member connected to the locking module body to be elastically transformable such that the first locking member selectively comes into contact with a terminal part inside the port, and a second locking member connected to the locking module body to be elastically transformable such that the second locking member is disposed by being spaced apart from the first locking member; and a pattern module which is installed to be movable between a locking position and an unlocking position inside and outside the module frame, the pattern module being configured to interfere with the first locking member such that the first locking member is in close contact with the terminal part and to be lock-coupled to the second locking member when the pattern module is inserted into the locking position, and having a key recess into which an unlocking key for separating the second locking member is inserted.

Accordingly, the port of an electronic device can be effectively blocked.

Here, the locking module body may include: a horizontal part which is located between an upper wall and a lower wall of the module frame, has a fixing recess formed in each of opposite sides of the horizontal part such that a fixing protrusion formed on the module frame is coupled to the fixing recess, and has a through hole formed in a center of the horizontal part such that each of the first and second locking members is received in the through hole by being connected to the horizontal part such that the first and second locking members are elastically transformable; an entrance blocking part which is formed by extending upward from a front end of the horizontal part and partially blocks an entrance of the module frame; and a guide rib which is formed on each of opposite edges of the horizontal part by protruding downward therefrom and has a guide recess which limits a reciprocating distance of the pattern module.

Accordingly, the pattern module may move relatively to the locking module such that the pattern module can be locked and unlocked.

In addition, the first locking member may be formed to be inclined toward the pattern module from an end thereof, which is connected to an inner wall of the through hole, to a free end thereof; a guide surface may be formed on the free end of the first locking member such that the guide surface is in contact with and is pressed by the pattern module moving to the locking position; and an interference protrusion may be formed on an upper surface of the first locking member by protruding therefrom such that the interference protrusion is in close contact with the terminal part of the port when the first locking member is elastically transformed by interfering with the pattern module.

Accordingly, the first locking member may be naturally locked and unlocked in conjunction with the movement of the pattern module.

In addition, the second locking member may be formed to be inclined toward the pattern module from a first end of the second locking member, which is connected to an inner wall of the through hole, to a second end thereof, and the second end of the second locking member may extend by protruding toward a lower part of the locking module body such that the second end of the second locking member is held by a holding jaw formed on the pattern module moving to the locking position.

Accordingly, the pattern module which is moved to the locking position may be securely fixed such that the pattern module does not freely move to the unlocking position.

In addition, the pattern module may include: a plate-shaped pattern module body formed such that the key recess is exposed to a front surface and a lower surface of the pattern module body; and a guide protrusion formed on each of opposite side edges of the pattern module body by protruding therefrom, wherein a pattern part to which a pattern key of the unlocking key is coupled and a latch key holding recess to which a latch key of the unlocking key is coupled may be formed respectively on inner surfaces different from each other inside the key recess.

Accordingly, the blocking module can be separated from the port by using only the unlocking key which has the pattern key having a shape corresponding to the pattern part of the key recess.

In addition, the pattern module body may include: a first receiving recess which is formed to be deeper gradually toward a front end of the pattern module body on an upper surface thereof such that the first locking member of the locking module is received in the first receiving recess; a first through hole formed at an end of the first receiving recess such that the first through hole communicates with the key recess; a second receiving recess which is formed to be deeper gradually toward a rear end of the pattern module body on the upper surface thereof such that the second locking member of the locking module is received in the second receiving recess; a holding jaw which is formed on an end of the second receiving recess such that an end of the second locking member is held by the holding jaw; and a second through hole which is formed to communicate with the key recess while sharing the holding jaw.

Accordingly, the pattern module and the locking module may be locked to each other and unlocked from each other in conjunction with each other.

In addition, in order to achieve the above objectives, the port locking apparatus of the present disclosure includes:

- the port blocking module of an electronic device which includes: the module frame which is formed to correspond to size and shape of the port of the electronic device and has the shape of a frame having opposite open ends; the locking module having the locking module body fixedly installed inside the module frame, the first locking member connected to the locking module body to be elastically transformable that the such first locking member selectively comes into contact with the terminal part inside the port, and the second locking member connected to the locking module body to be elastically transformable such that the second locking member is disposed by being spaced apart from the first locking member; and the pattern module which is installed to be movable between the locking position and the unlocking position inside and outside the module frame, the pattern module being configured to interfere with the first locking member such that the first locking member is in close contact with the terminal part and to be lock-coupled to the second locking member when the pattern module is inserted into the locking position, and having the key recess into which an unlocking key for separating the second locking member is inserted; and
- the unlocking key having the pattern key which is inserted into the key recess by protruding from a front end of an unlocking key body and interferes with the second locking member such that the pattern module is separated from the second locking member to be unlocked from the locking module, and the latch key which is installed movably outside the pattern key and extends inside the key recess to be held in the key recess such that the pattern module is able to be moved to the unlocking position.

Accordingly, the blocking module coupled to the port may be removed therefrom by using only an authorized unlocking key having the pattern key formed into a pattern corresponding to the pattern of the inside of the key recess.

Here, a pattern corresponding to the pattern part formed on an inner wall of the key recess may be formed on a front end of the pattern key.

In addition, the latch key holding recess in which the latch key is held may be formed in each of opposite side wall surfaces of the inside of the key recess.

According to the port blocking module of an electronic device of the present disclosure and the port locking apparatus having the same, the blocking module which is inserted into the port of an electronic device such as an USB port can be prevented from being freely removed therefrom, thereby securely blocking the port of an electronic device.

In addition, the blocking module which is coupled to the port and is locked can be removed from the port by using only the unlocking key having the pattern key formed into a pattern corresponding to the pattern part inside the key recess of the blocking module.

That is, when the pattern key of the unlocking key is completely inserted into the key recess of the blocking module, the latch key can reach a position at which the latch key can be held in the latch key holding recess inside the key recess, so the blocking module cannot be separated from the port by using a tool other than the unlocking key authorized in advance. Accordingly, the port of the electronic device can be more reliably blocked to increase security.

DETAILED DESCRIPTION

Figure 1:
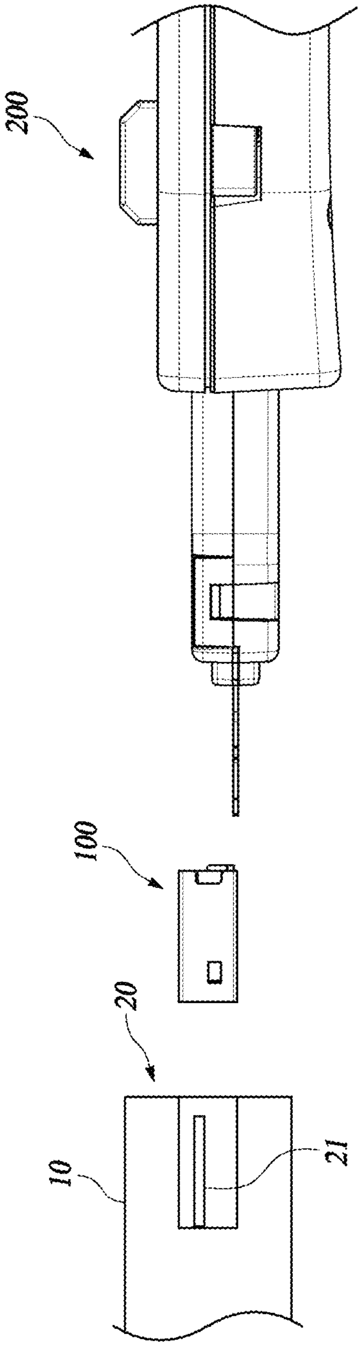
FIG. 1 is a schematic configuration diagram illustrating a port locking apparatus of the present disclosure.

Hereinafter, a port locking apparatus according to an embodiment of the present disclosure will be described in detail with reference to the accompanying drawings.

Referring to FIGS. 1 to 31, the port locking apparatus according to the embodiment of the present disclosure includes a blocking module 100 which is inserted into the port 20 of the electronic device 10 and blocks the port 20, and an unlocking key 200 which unlocks the blocking module 100 inserted into and coupled to the port 20 such that the blocking module 100 is moved out of the port 20.

The blocking module 100 includes a module frame 110, a locking module 120 which is fixedly installed inside the module frame 110, and a pattern module 130 which is movably installed inside the module frame 110 such that the pattern module 130 is movable relatively to the locking module 120.

The module frame 110 has a quadrangular frame shape open at front and rear thereof, and includes a lower wall 111, an upper wall 112, and a pair of side walls 113. The module frame 110 is manufactured in shape and size corresponding to the port 20 of an electronic device to be blocked. A fixing protrusion 114 is formed on each of the side walls 113 by protruding inward therefrom to fix the locking module 120.

The locking module 120 includes a locking module body 121 which is fixedly installed inside the module frame 110, and a first locking member 123 and a second locking member 125 which are installed movably on the locking module body 121.

The locking module body 121 includes a horizontal part 121*a* located between the upper wall 112 and the lower wall 111 of the module frame 110, an entrance blocking part 121*b* formed by extending upward from the front end of the horizontal part 121*a*, and a guide rib 121*c* formed on each of the opposite edges of the horizontal part 121*a* by protruding downward therefrom. A fixing recess 122 to which the fixing protrusion 114 is fitted and coupled is formed in each of the opposite side surfaces of the horizontal part 121*a*. A guide recess 124 is formed in the guide rib 121*c* so as to limit the reciprocating distance of a pattern module 130 and guide the pattern module 130.

The first locking member 123 is connected to the locking module body 121 at an end thereof and can be elastically transformed vertically by external force. An interference protrusion 123*a* is formed on a free end of the first locking member 123 by protruding therefrom such that the interference protrusion 123*a* is in contact with a terminal part 21 installed inside the port 20. In addition, a guide surface 123*b* is formed to be inclined on the free end of the first locking member 123. The free end of the first locking member 123 is formed to be inclined downward by protruding toward a lower side, that is, toward the lower surface of the locking module body 121. Accordingly, when inserting the blocking module 100 into the port 20 of an electronic device, the interference protrusion 123*a* does not interfere with the terminal part 21 of the port 20 (see FIGS. 8 to 11). On the other hand, as illustrated in FIGS. 12 to 15, when the pattern module 130 is completely inserted into the module frame 110 and is located at a locking position, the guide surface 123*b* of the free end of the first locking member 123 interferes with the pattern module 130 and the first locking member 123 is transformed such that the first locking member 123 is pressed on the pattern module 130. In this state, the interference protrusion 123*a* is in close contact with the terminal part 21 of the port 20 to be locked, and thus the blocking module 100 is held so as not to be naturally removed from the port 20.

Figure 13:
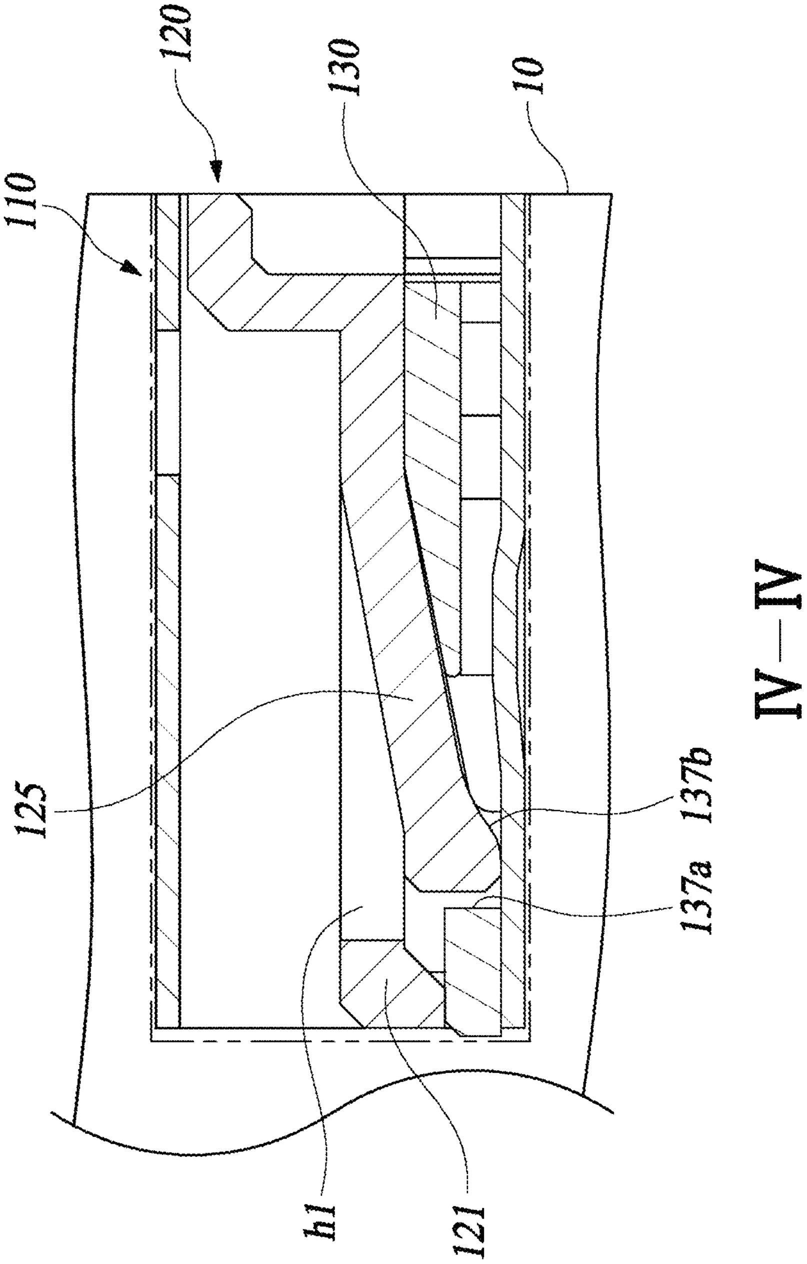
FIG. 13 is a sectional view taken along line IV-IV of FIG. 12.
Figure 16:
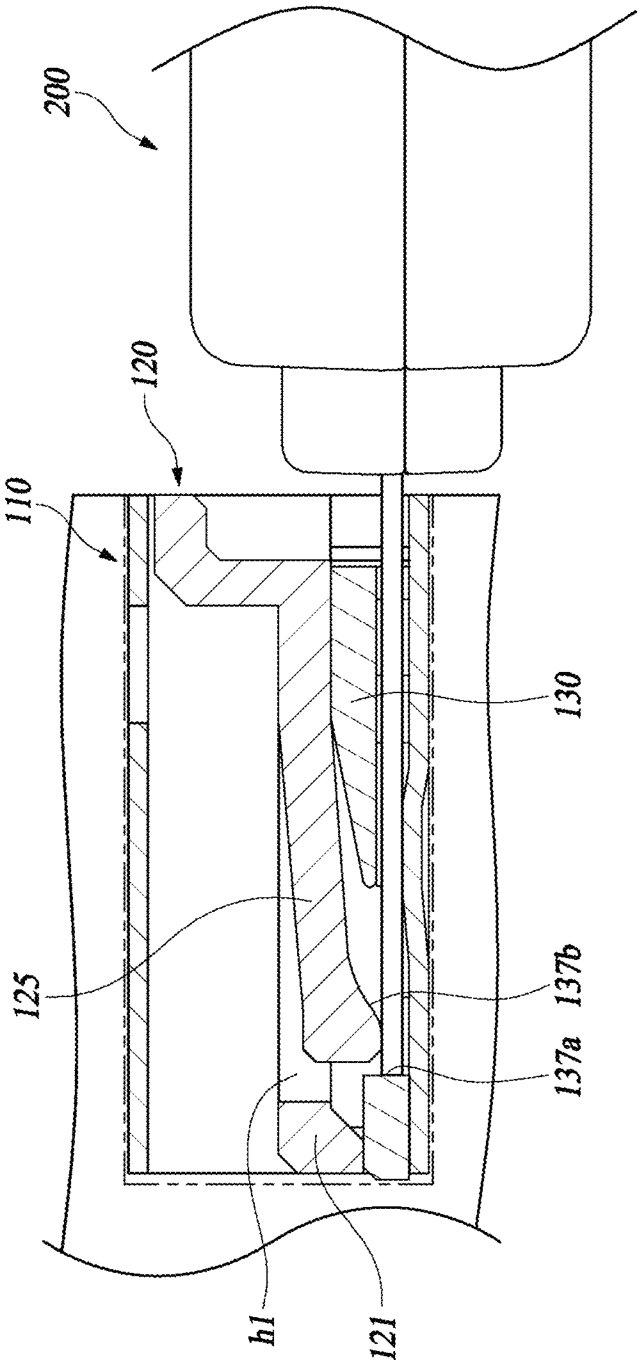
FIG. 16 is a sectional view illustrating a state in which a pattern key and a latch key of the unlocking key are coupled to a key recess in the state of FIG. 13.
Figure 17:
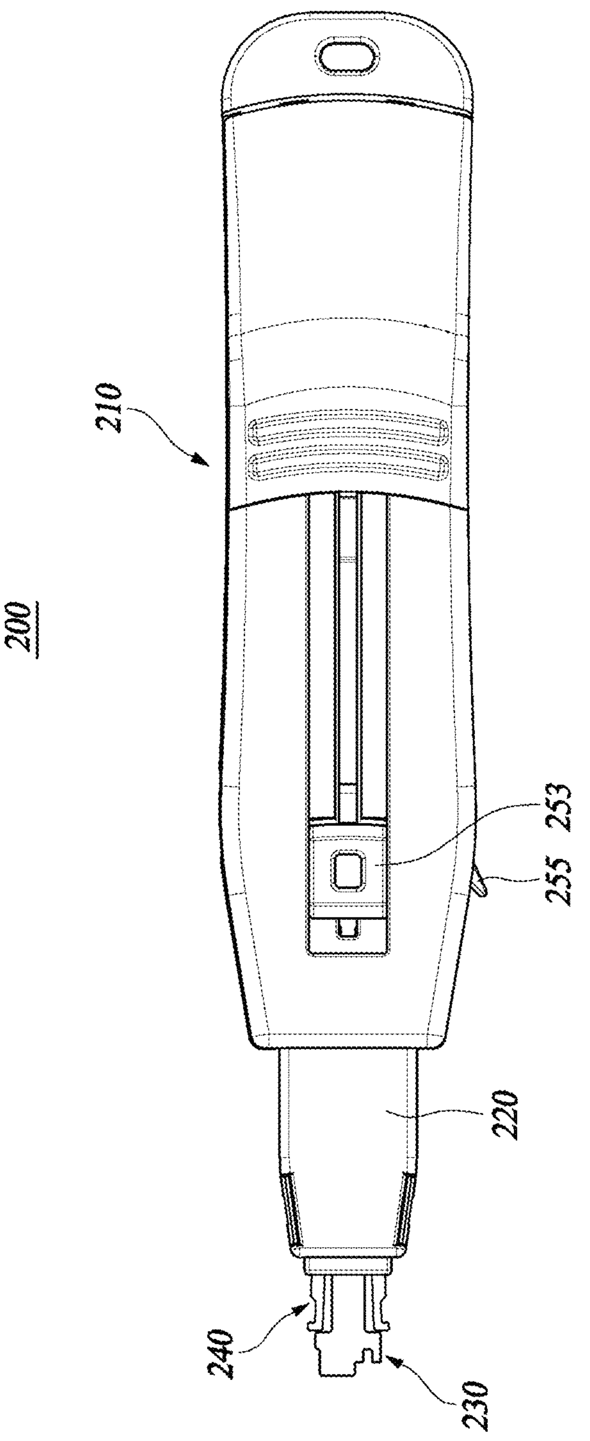
FIG. 17 is a top plan view illustrating the unlocking key illustrated in FIG. 1.
Figure 18:
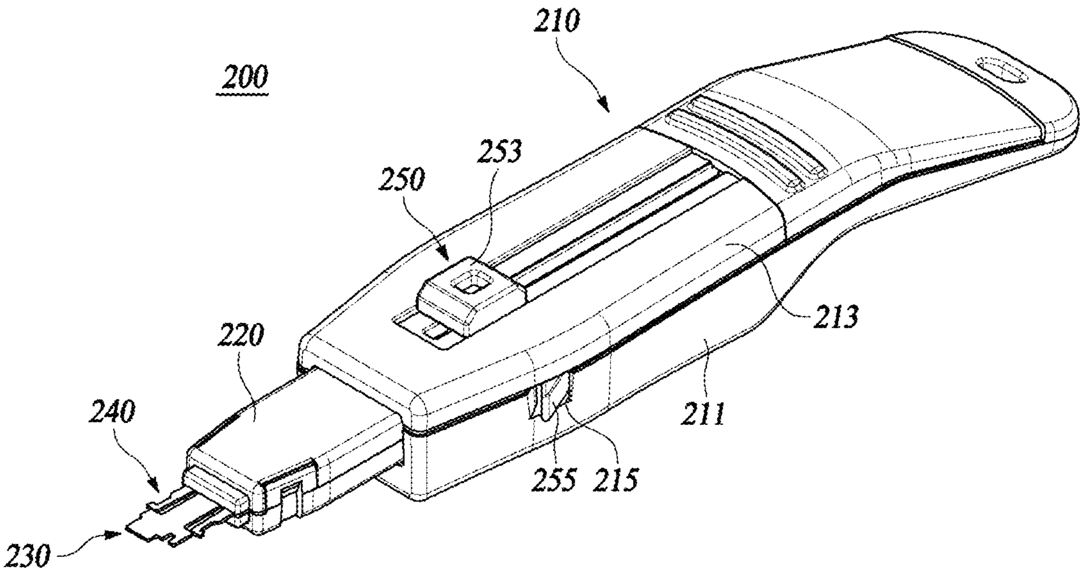
FIG. 18 is a perspective view of the unlocking key illustrated in FIG. 17.
Figure 19:
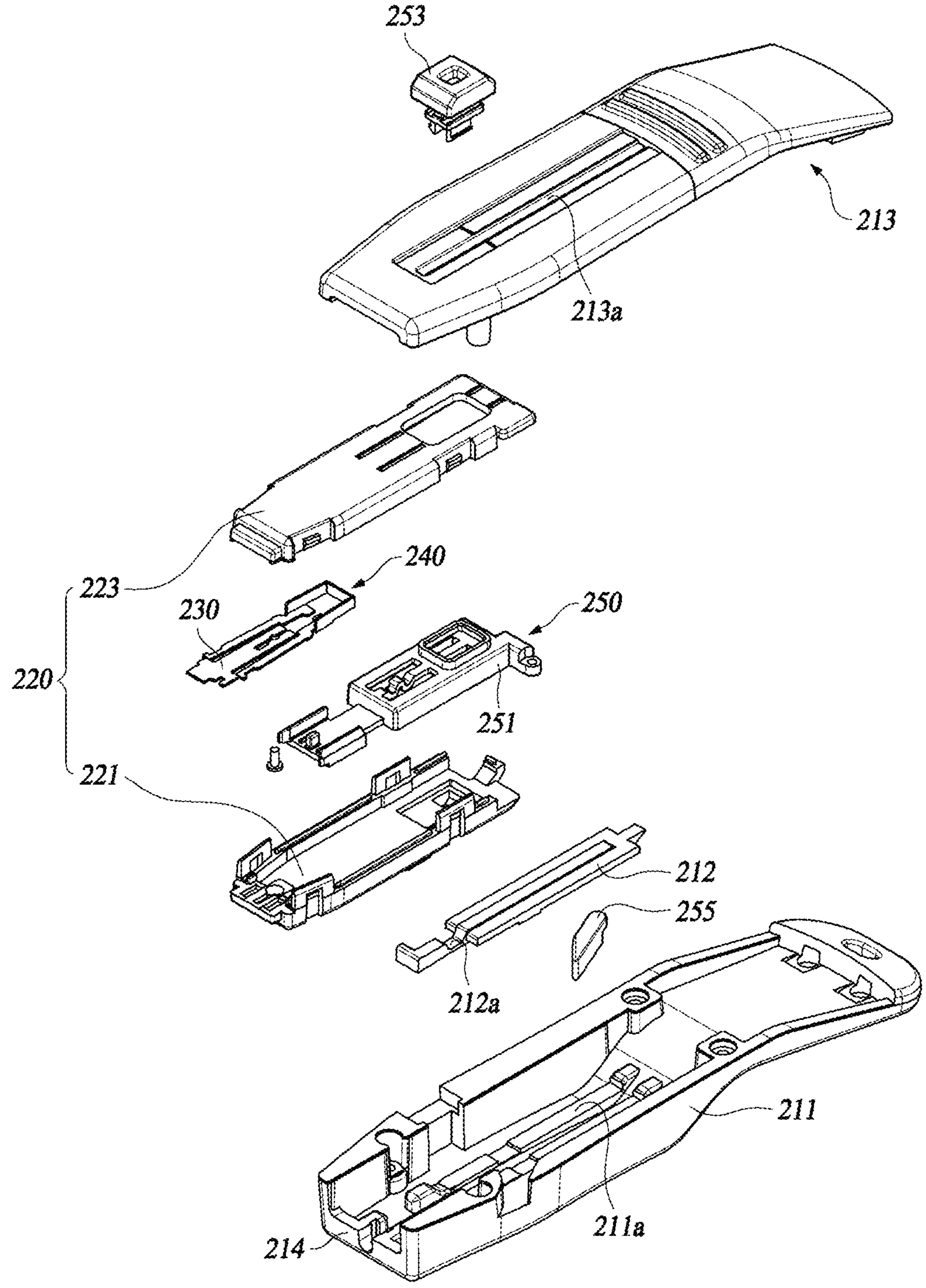
FIGS. 19 and 20 are exploded perspective views of the unlocking key illustrated in FIG. 17.
Figure 20:
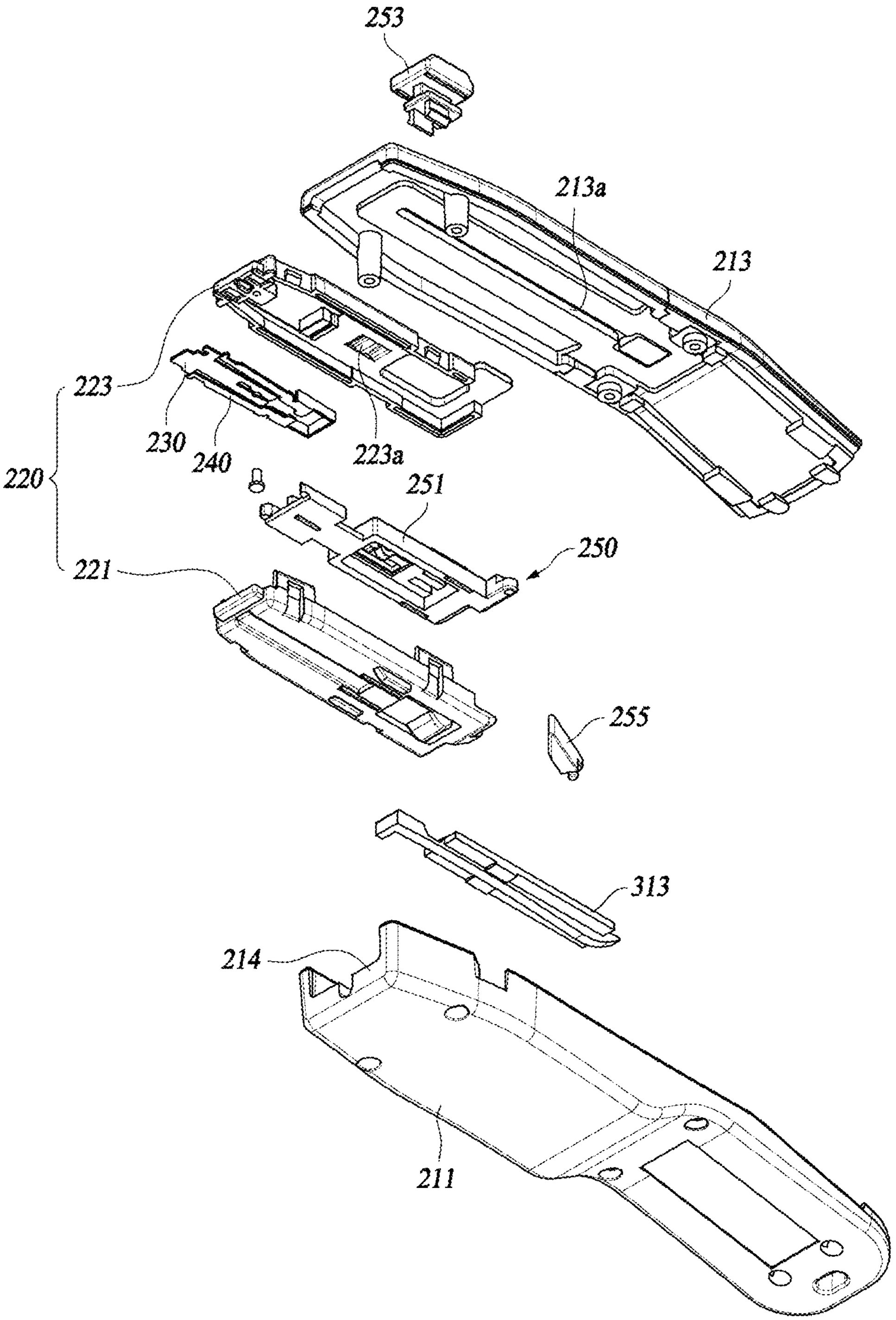

An end of the second locking member 125 is connected to the locking module body 121, and a free end thereof extends to protrude to the lower side of the locking module body 121. The free end of the second locking member 125 is held by a holding jaw 137*a* formed on the pattern module 130. That is, as illustrated in FIG. 13, when the pattern module 130 is completely inserted into the module frame 110 and is located at the locking position, the holding jaw 137*a* of the pattern module 130 is in contact with and held by the free end of the second locking member 125. Accordingly, the second locking member 125 is pushed by the unlocking key 200 so as to be separated from the holding jaw 137*a* (see FIG. 16). That is, as illustrated in FIG. 16, the second locking member 125 is pushed by a pattern key 230 of the unlocking key 200 inserted into a key recess 135 of the pattern module 130 and is unlocked by moving out of the holding jaw 137*a*, and in this state, the pattern module 130 may be pulled out to the unlocking position (see FIG. 9).

A through hole h1 in which the first and second locking members 123 and 125 are received is formed vertically through the locking module body 121. One end of each of the first and second locking members 123 and 125 is connected to the inner wall of the through hole h1.

The pattern module 130 is coupled in coupling space between the lower wall 111 of the module frame 110 and the locking module 120 such that the pattern module 130 can reciprocate therein. That is, the pattern module 130 can move between the locking position of FIG. 13 and the unlocking position of FIG. 9, and in order to move the pattern module 130 from the locking position to the unlocking position, the unlocking key 200 is required to be used.

The pattern module 130 has a pattern module body 131 of a plate shape, and guide protrusions 133 formed by protruding respectively from the opposite side edges of the pattern module body 131.

The key recess 135 into which the pattern key 230 and a latch key 240 of the unlocking key 200 are inserted is formed in the lower surface of the pattern module body 131. The key recess 135 is exposed to the lower and front surfaces of the pattern module body 131. A pattern part 135*a* corresponding to the pattern of the pattern key 230, and a latch key holding recess 135*b* to which the latch key 240 is coupled are formed inside the key recess 135. The pattern part 135*a* is formed on an inner rear end surface the key recess 135 corresponding to the entrance of the key recess 135, and the latch key holding recess 135*b* is formed in each of the opposite side surfaces of the key recess 135.

In addition, a first receiving recess 136 is formed in the upper surface of the pattern module body 131 such that the first locking member 123 of the locking module 120 is received in the first receiving recess 136. The first receiving recess 136 is formed to be deeper gradually toward the front end of the pattern module body 131, and a first through hole 136*a* communicating with the key recess 135 is formed in an end of the first receiving recess 136. In addition, a contact press surface 136*b* corresponding to the guide surface 123*b* of the first locking member 123 is slantingly formed in the first receiving recess 136.

Figure 9:
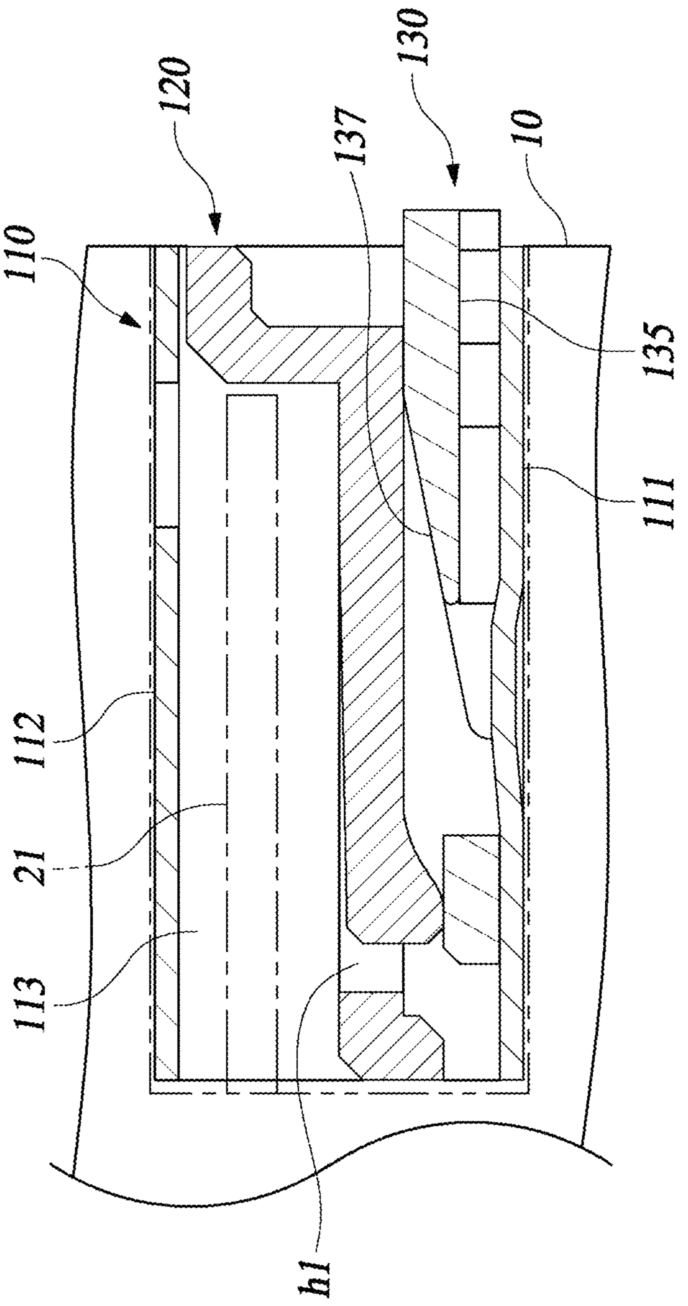
FIG. 9 is a sectional view taken along line I-I of FIG. 8.
Figure 10:
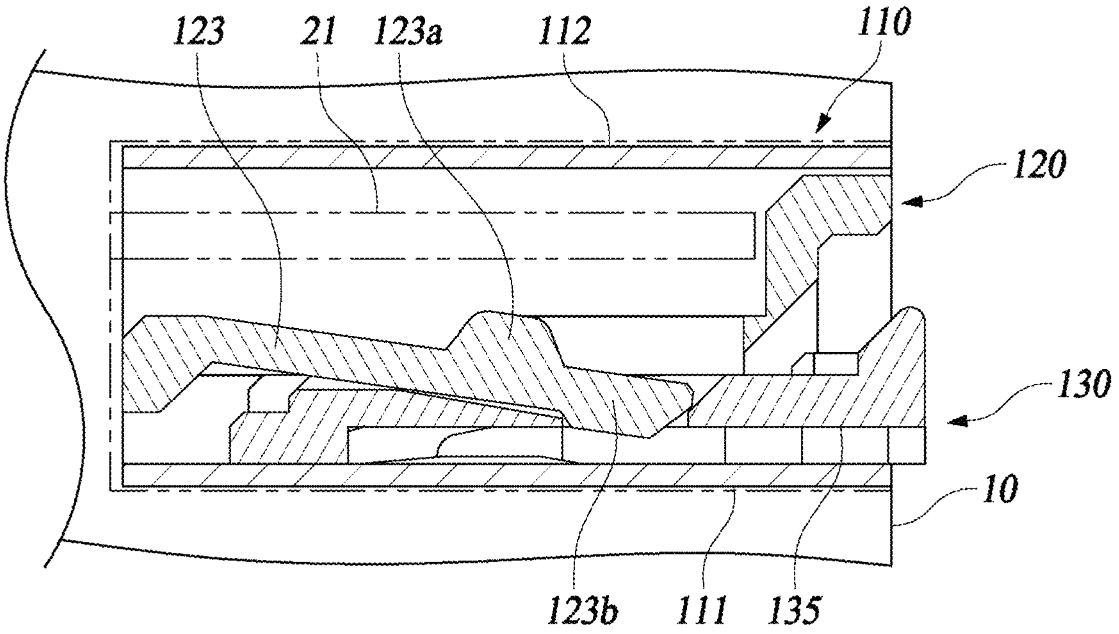
FIG. 10 is a sectional view taken along line II-II of FIG. 8.
Figure 11:
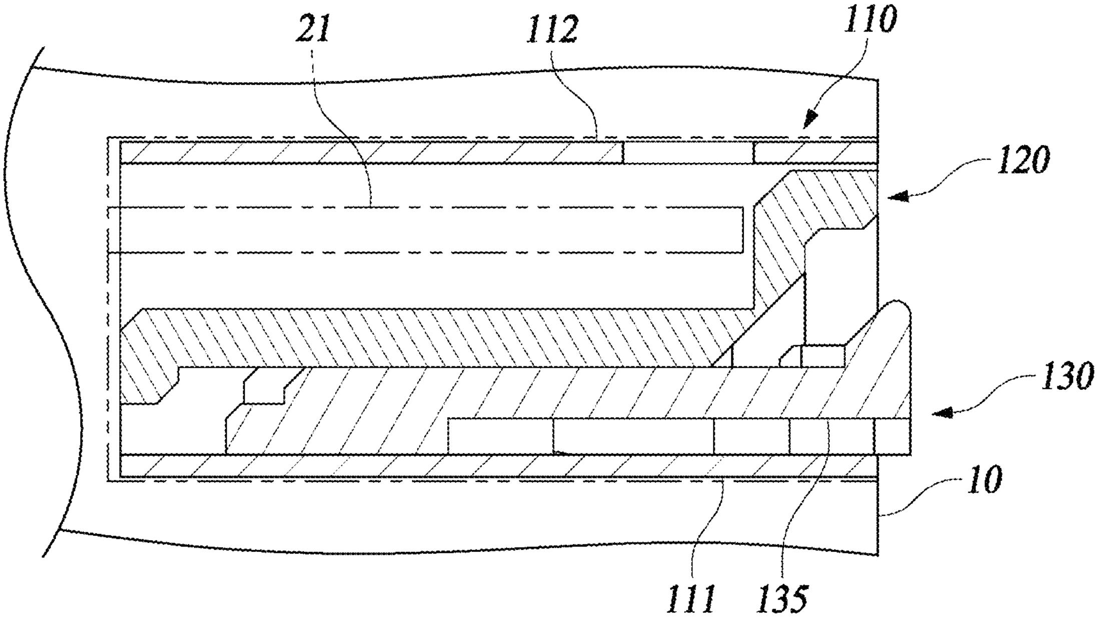
FIG. 11 is a sectional view taken along line III-III of FIG. 8.
Figure 12:
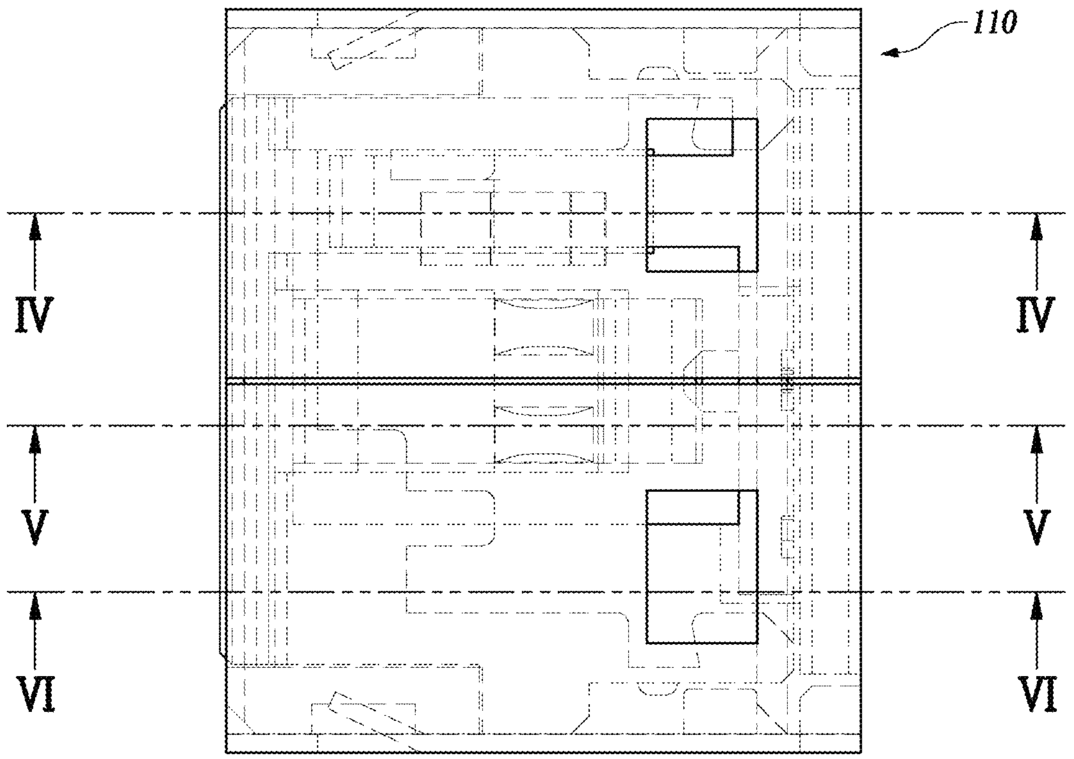
FIG. 12 is a top plan view illustrating a state in which the pattern module of the blocking module is located at a locking position.

In addition, a second receiving recess 137 in which the second locking member 125 is received is formed in the upper surface of the pattern module body 131 by being recessed therefrom. The second receiving recess 137 is formed to be deeper gradually toward a rear end of the pattern module body 131 from the front end thereof, and the holding jaw 137*a* by which the free end of the second locking member 125 is held is formed on an end of the second receiving recess 137. A second through hole 137*b* is formed in the end of the second receiving recess 137 by extending from the holding jaw 137*a* such that the second through hole 137*b* communicates with the key recess 135. According to such a configuration, as illustrated in FIGS. 9 to 11, when the pattern module 130 is located at the unlocking position, the first locking member 123 is received in the first receiving recess 136, and the second locking member 125 is not received in the second receiving recess 137. In this state, when the pattern module 130 is pushed into the module frame 110 and is located at the locking position (see FIGS. 13 to 15), the first locking member 123 interferes with the contact press surface 136*b* and moves out of the first receiving recess 136 to move upward, and thus the interference protrusion 123*a* is in close contact with the terminal part 21 of the port 20. Additionally, the free end of the second locking member 125 is held by the holding jaw 137*a* of the second receiving recess 137 and protrudes to the key recess 135 through the second through hole 137*b*.

The unlocking key 200 includes a main body casing 210, a movable housing 220 installed to protrude from the front of the main body casing 210, the pattern key 230 which protrudes from the front end of the movable housing 220, the latch key 240 disposed at the opposite sides of the pattern key 230, and a manipulation part 250 for manipulating the movement of the movable housing 220 and the latch key 240.

The main body casing 210 includes a lower casing 211 and an upper casing 213 which are coupled to each other. A fixing slit 211*a* is formed in the bottom of the inside of the lower casing 211. A guide member 212 is coupled to the fixing slit 211*a*. A stopper recess 212*a* is formed in the upper surface of the guide member 212. A guide slit 213*a* is formed in the upper casing 213 such that a main manipulation knob 253 of the manipulation part 250 is coupled to the guide slit 213*a* such that the main manipulation knob 253 can reciprocate. A through hole 214 is formed in the front end of the main body casing 210 such that the movable housing 220 can move in and out of the main body casing 210 through the through hole 214.

Figure 22:
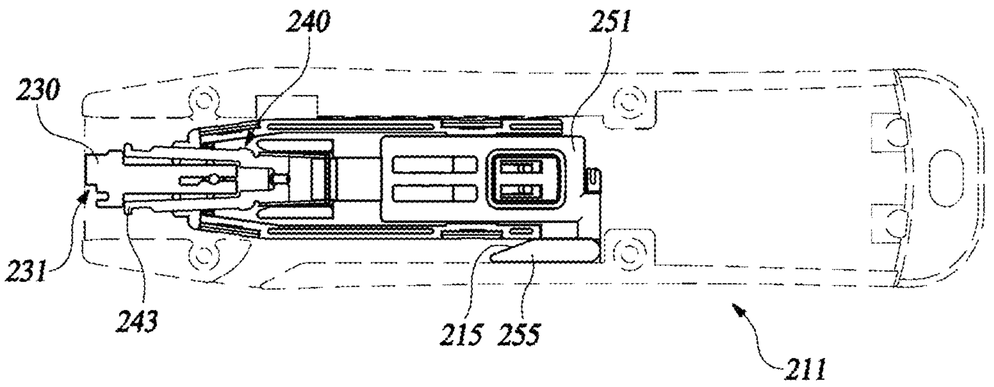
FIG. 22 is a cross-sectional view illustrating a state before a movable housing of the unlocking key protrudes.
Figure 23:
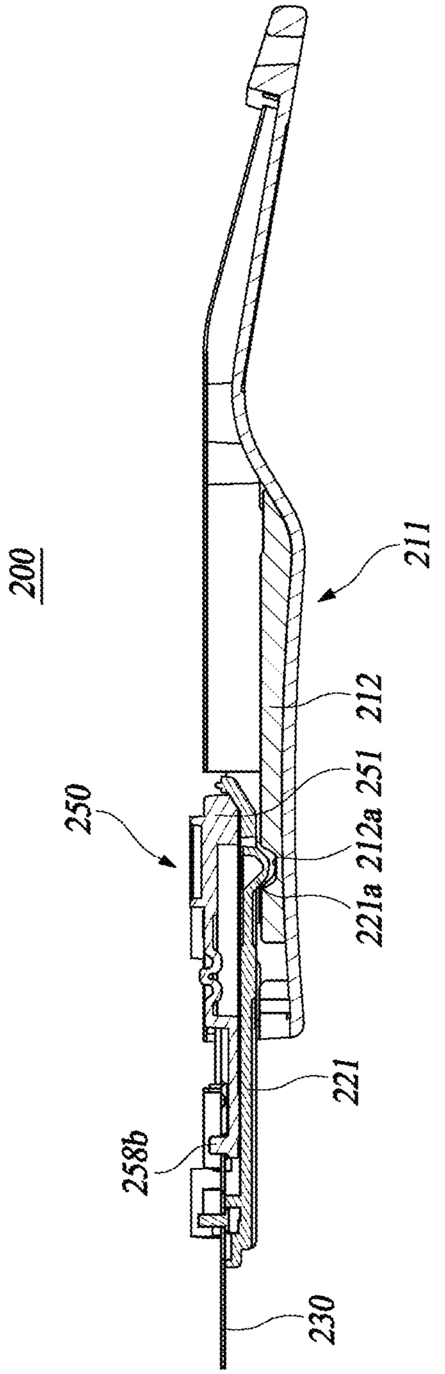
FIG. 23 is a sectional view taken along line VII-VII of FIG. 21.

The movable housing 220 is installed in the main body casing 210 to move in and out of the main body casing 210 through the through hole 214 of the front end of the main body casing 210. The movable housing 220 includes a lower housing 221 and an upper housing 223 which are coupled to each other. The lower housing 221 is slidably supported on the guide member 212. An elastic protrusion 221*a* is formed on the lower housing 221 by protruding downward therefrom, the elastic protrusion being elastically inserted into and coupled to the stopper recess 212*a* of the guide member 212. Accordingly, when the movable housing 220 in the state of FIG. 22 is pushed and protruded from the front end of the main body casing 210 as illustrated in FIG. 23, the elastic protrusion 221*a* is held in the stopper recess 212*a* such that the position of the movable housing 220 can be fixed. In this state, when the main manipulation knob 253 is further pushed, a movable member 251 to be described later is more moved such that the movement of the latch key 240 can be controlled.

The pattern key 230 is fixed to the movable housing 220 by a screw or fixing pin such that the pattern key 230 protrudes from the front end of the movable housing 220. That is, the pattern key 230 is fixed to the movable housing 220 at a first end thereof by a fastening means such as a bolt, and has a key recess coupling part 231 at a second end thereof, the key recess coupling part having a pattern shape corresponding to the pattern part 135*a* of the key recess 135 of the pattern module 130. Such a pattern key 230 has a plate shape.

The latch key 240 has a latch key body 241 installed inside the movable housing 220, and latch key parts 243 extending from the latch key body 241. The latch key body 241 has an approximate "U" shape and includes a pair of elastic parts 241*b* bending and extending from a connection part 241*a* to face each other at opposite sides relative to the connection part 241*a*. Each of the latch key parts 243 is formed integrally on an end part of each of the elastic parts 241*b* by bending and extending therefrom. Here, the latch key parts 243 extend by bending orthogonally to the elastic parts 241*b*, respectively, and are preferably disposed at the opposite sides of the pattern key 230 by extending with the same heights and thicknesses. In addition, a holding jaw 243*b* is formed on the inner side of the latch key part 243, the holding jaw 243*b* being held by an end portion of the rear end of the pattern key 230. In addition, an inclined guide surface 243*c* is formed on the outer edge of the latch key part 243. When the elastic parts 241*b* are pressed by external forces from opposite sides, the elastic parts 241*b* are elastically transformed and the one pair of latch key parts 243 approach each other to be in close contact with the pattern key 230. The latch key part 243 has a plate shape, and a holding protrusion 243*a* is formed on an end of the latch key part 243 by protruding laterally therefrom such that the holding protrusion 243*a* is held in the latch key holding recess 135*b* inside the key recess 135. In addition, opening interference parts 243*d* are formed respectively on rear ends of the latch key parts 243, the opening interference parts 243*d* being configured to interfere with a holding protrusion 258*b* to be described later and be opened during the rearward movement of the movable member 251 to be described later. The movement of the latch key 240 having such a configuration is controlled by the operation of the manipulation part 250.

The manipulation part 250 includes the movable member 251 installed inside the movable housing 220 such that the movable member 251 can reciprocate by a predetermined distance, the main manipulation knob 253 connected to the movable member 251, and a sub manipulation knob 255 connected to the movable member 251.

The movable member 251 is installed inside the movable housing 220 such that the movable member 251 can reciprocate by a predetermined distance. The movable member 251 includes a movable member body 257 to which the main manipulation knob 253 is coupled, and an operation part 258 which extends from the movable member body 257 and operates the latch key 240. The movable member body 257 includes a first coupling part 257*a* to which the main manipulation knob 253 is coupled, a second coupling part 257*b* to which the sub manipulation knob 255 is rotatably coupled, and an elastic protrusion 257*c* protruding to the outside of the movable member 251. The first coupling part 257*a* is formed on the upper surface of the movable member body 257, and the second coupling part 257*b* is formed on the rear end of the movable member body 257 by protruding laterally therefrom. The elastic protrusion 257*c* is formed to protrude to the upper surface of the movable member body 257 and is connected to the movable member body 257 such that the elastic protrusion 257*c* is elastically transformed by external force. The elastic protrusion 257*c* is selectively held by a holding protrusion 223*a* formed on the upper housing 223 of the movable housing 220 such that the movable member 251 is fixed in position when the movable member 251 is moved forward.

Figure 26:
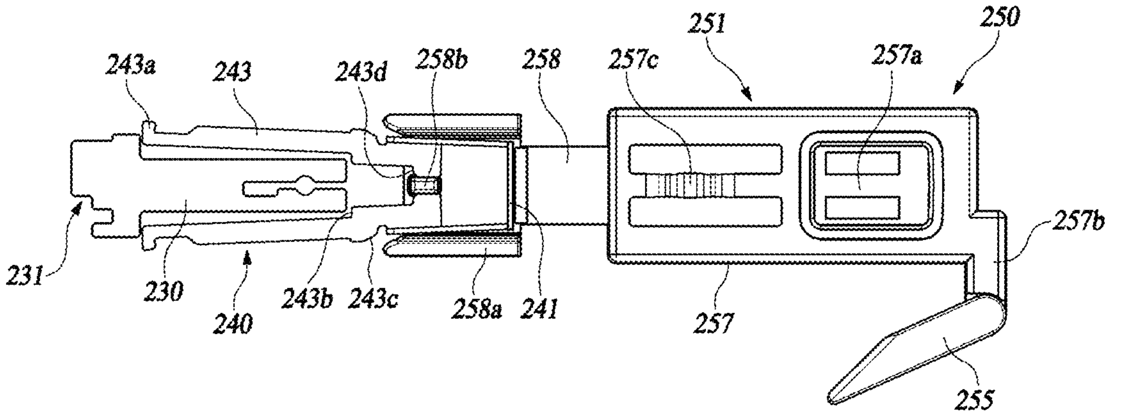
FIG. 26 is a top plan view of FIG. 25.
Figure 27:
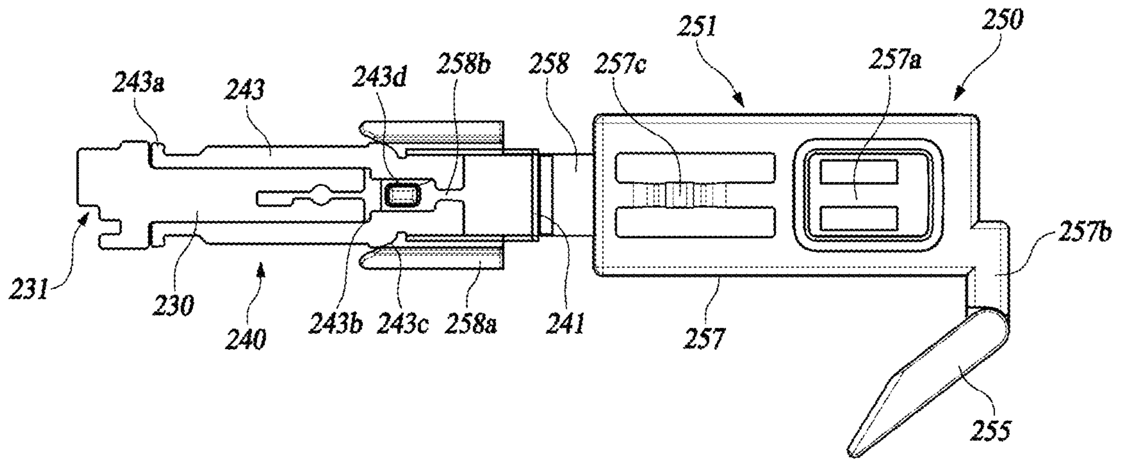
FIG. 27 is a top plan view illustrating a state in which the latch key is narrowed by moving the movable member in FIG. 26.
Figure 28:
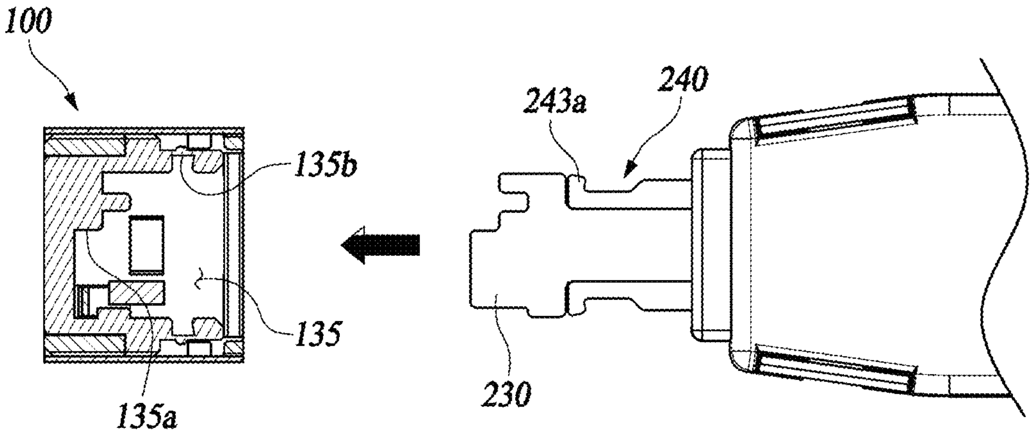
FIG. 28 is a bottom view illustrating a state before the unlocking key is coupled to the key recess of the blocking module.
Figure 30:
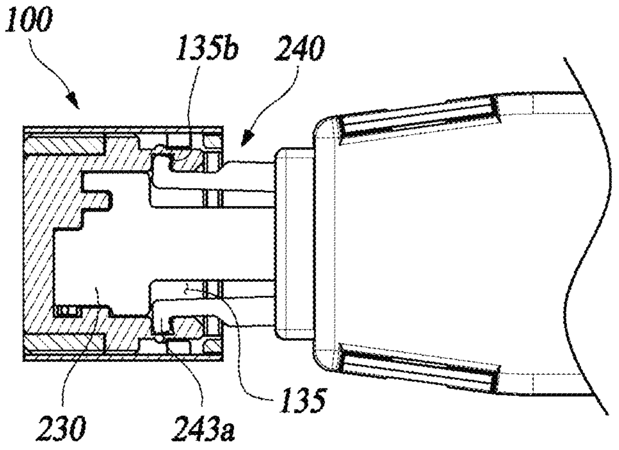
FIG. 30 is a bottom view illustrating a state in which the latch key is opened from the state of FIG. 29.

The operation part 258 has a pair of unlocking interference ribs 258*a* which support the latch key body 241 of the latch key 240 from the outside and interfere with the latch key parts 243 to be closed while moving, and the holding protrusion 258*b* which is disposed between the unlocking interference ribs 258*a* and allows the latch key parts 243 to be opened. The unlocking interference ribs 258*a* are formed respectively on the opposite edges of the operation part 258 by protruding parallel to each other therefrom and support the elastic parts 241*b* of the latch key body 241 from the outside. When the movable member 251 moves forward, the unlocking interference ribs 258*a* interfere with the guide surfaces 243*c* of the latch key parts 243 and close the latch key parts 243 as illustrated in FIG. 27. Before the movable member 251 moves forward, the holding protrusion 258*b* is located between the opening interference parts 243*d* of the latch key parts 243 as illustrated in FIG. 26, and blocks the closing of the latch key parts 243. In addition, when the movable member 251 moves forward to the maximum, the latch key parts 243 interfere with the unlocking interference ribs 258*a* by moving out of the holding protrusion 258*b* and are closed as illustrated in FIG. 27, and thus can be inserted into the key recess 135. After the latch key parts 243 are inserted into the key recess 135, the movable member 251 is moved backward a predetermined distance by manipulating the main manipulation knob 253 or the sub manipulation knob 255. In this case, the latch key parts 243 are opened by the holding protrusion 258*b* as illustrated in FIG. 30, and the holding protrusions 243*a* are held in the latch key holding recess 135*b* inside the key recess 135 as illustrated in FIG. 30.

The main manipulation knob 253 is exposed to the outer side of the main body casing 210 such that the main manipulation knob 253 is connected to the movable member 251, and can reciprocate along the guide slit 213*a*. The sub manipulation knob 255 is connected rotatably to the second coupling part 257*b* at an end thereof, and can protrude from the side surface of the main body casing 210 through an inclined hole 215 formed in the side surface of the main body casing 210. Accordingly, when the sub manipulation knob 255 protrudes through the inclined hole 215, a user can manipulate the holding operation of the latch key 240 by easily manipulating the sub manipulation knob 255 in a narrow environment in which it is difficult to manipulate the main manipulation knob 253.

The operation effect of the PORT LOCKING APPARATUS of an electronic device having the above configuration according to the embodiment of the present disclosure will be described in detail.

Figure 2:
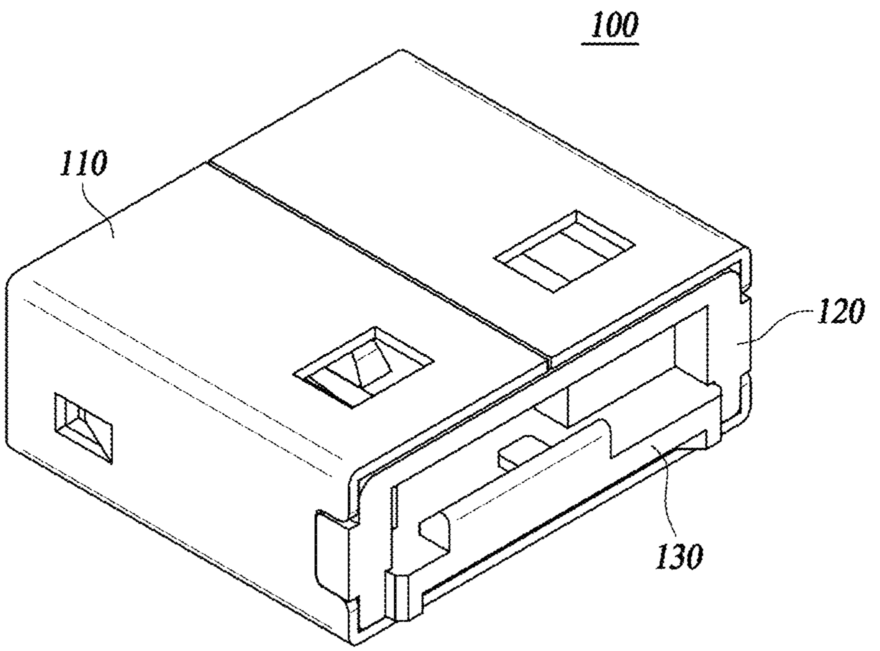
FIG. 2 is a perspective view illustrating a blocking module illustrated in FIG. 1.
Figure 3:
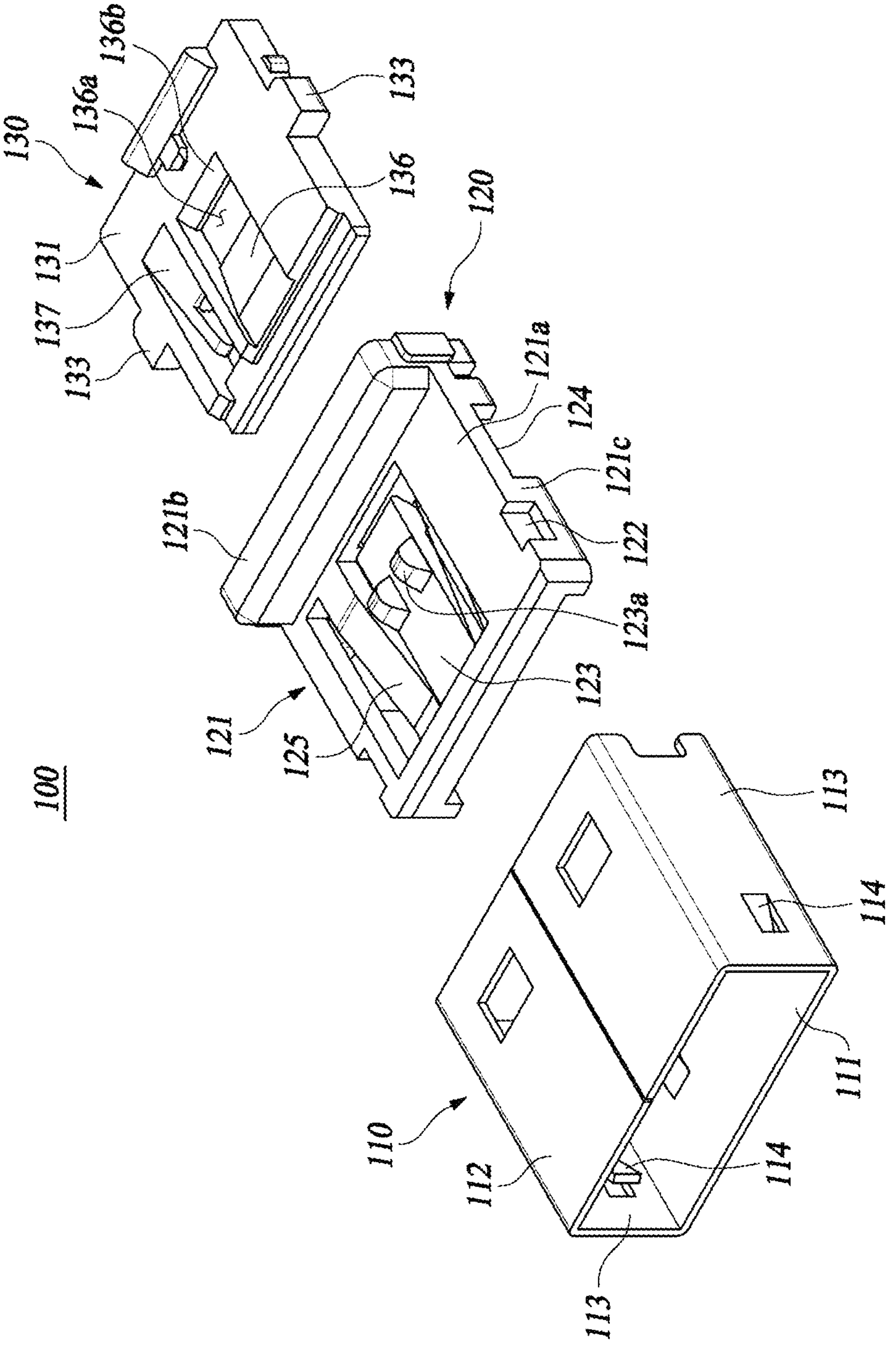
FIGS. 3 and 4 are exploded perspective views of the blocking module illustrated in FIG. 2.
Figure 4:
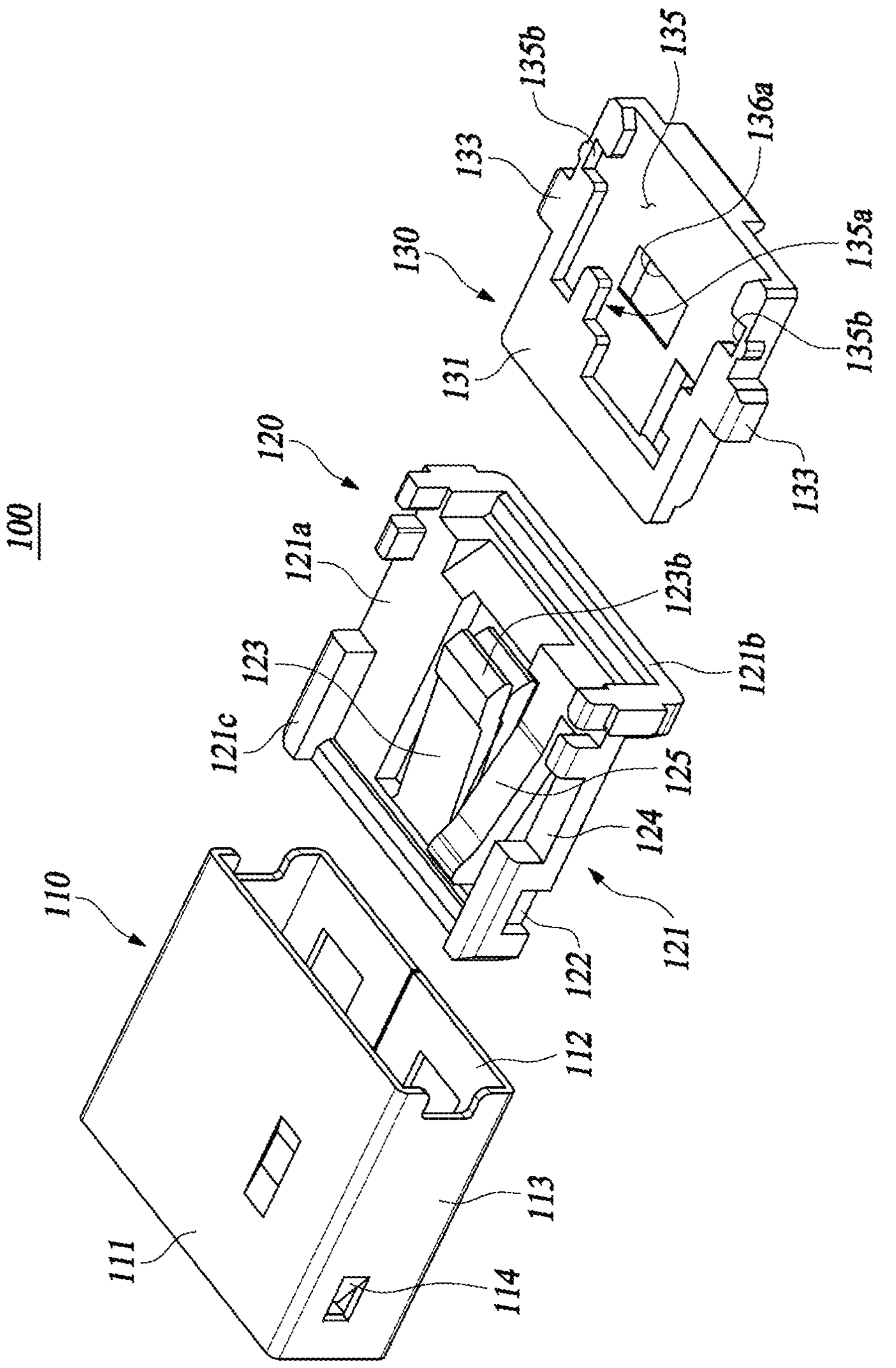
Figure 5:
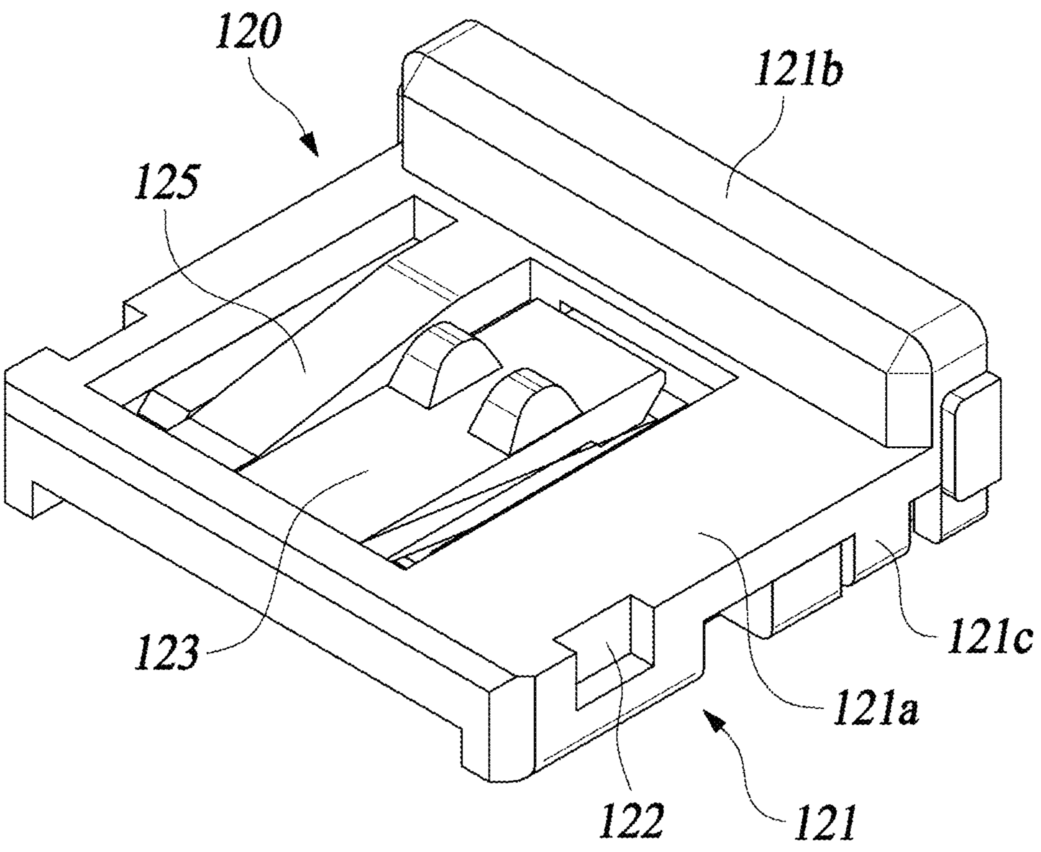
FIGS. 5 and 7 are perspective views illustrating a state in which a locking module and a pattern module of FIG. 3 are coupled to each other.
Figure 6:
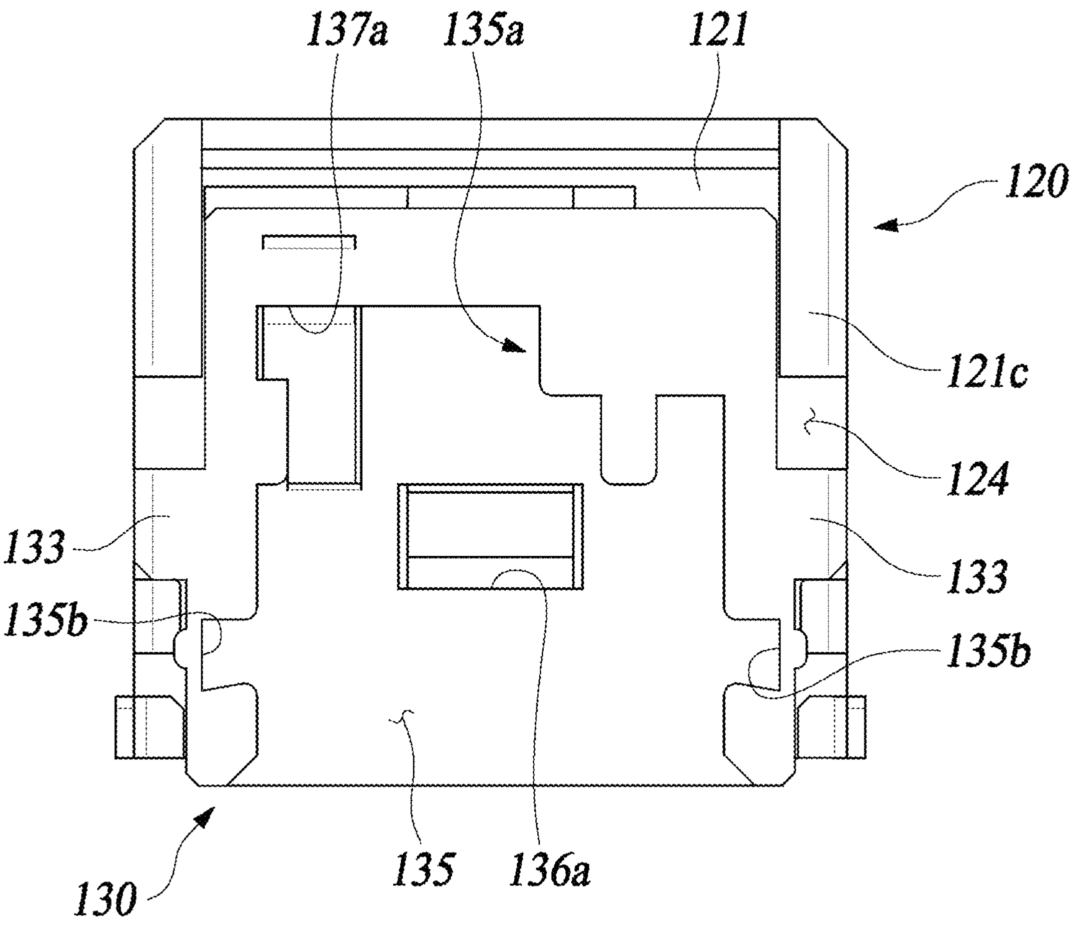
FIG. 6 is a bottom view of FIG. 5.
Figure 7:
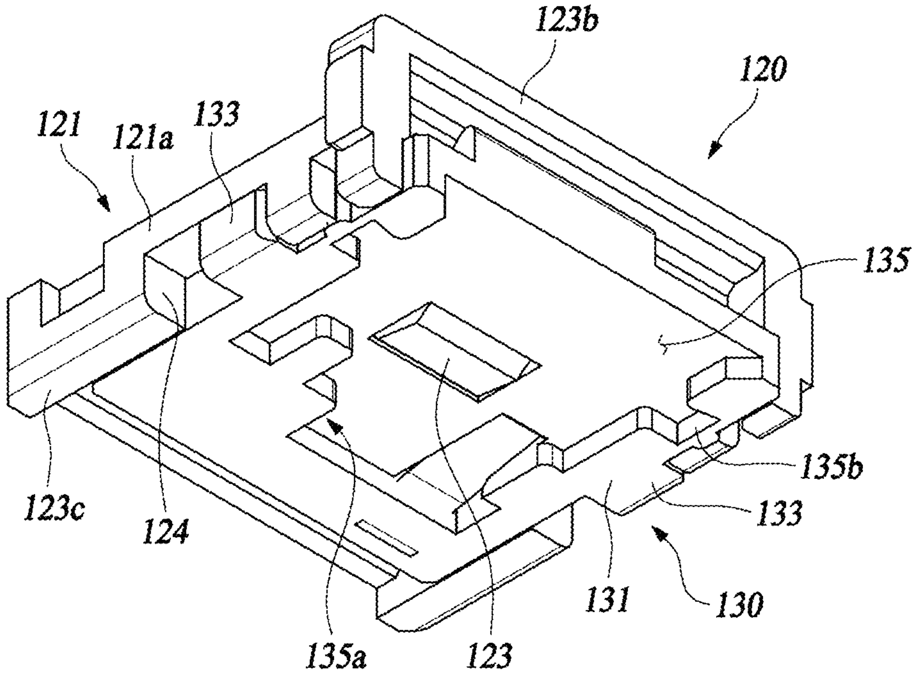
Figure 8:
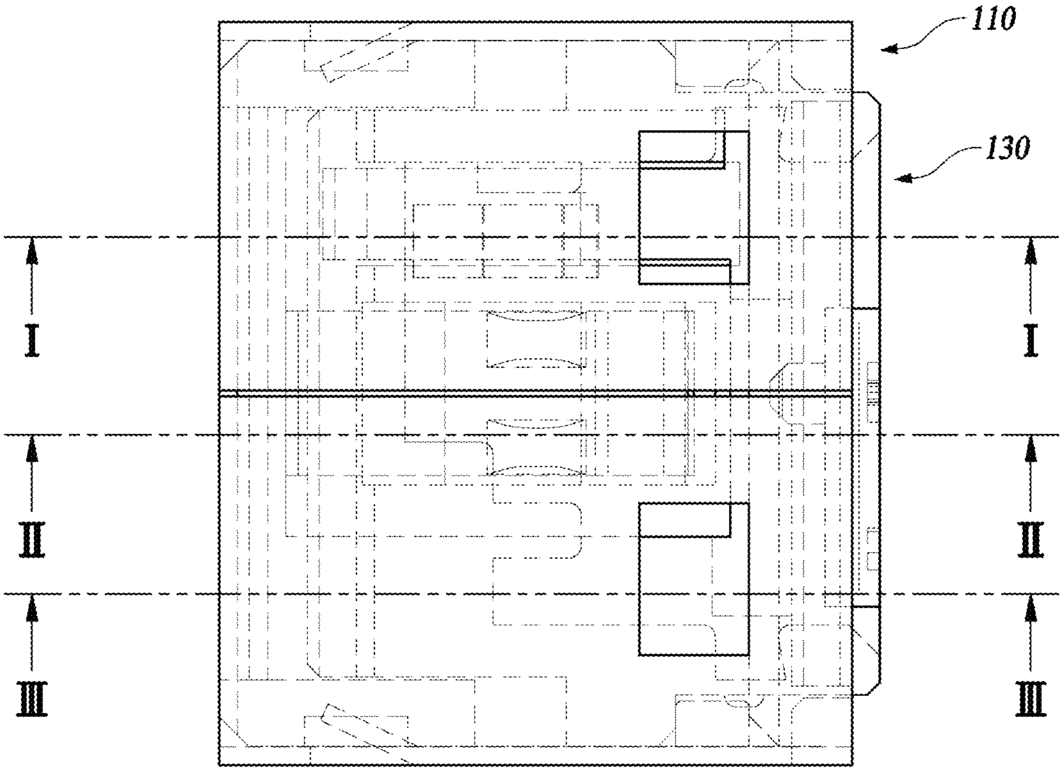
FIG. 8 is a top plan view illustrating a state in which the pattern module of the blocking module is located at an unlocking position.

First, as illustrated in FIGS. 2 and 8, when the pattern module 130 is located at the unlocking position, the blocking module 100 is inserted into the port 20 of an electronic device. In this case, as illustrated in FIGS. 9 to 11, the terminal part 21 is located in space between the locking module 120 and the module frame 110, and is maintained without interference therewith. That is, the first locking member 123 is separated from the terminal part 21.

Figure 14:
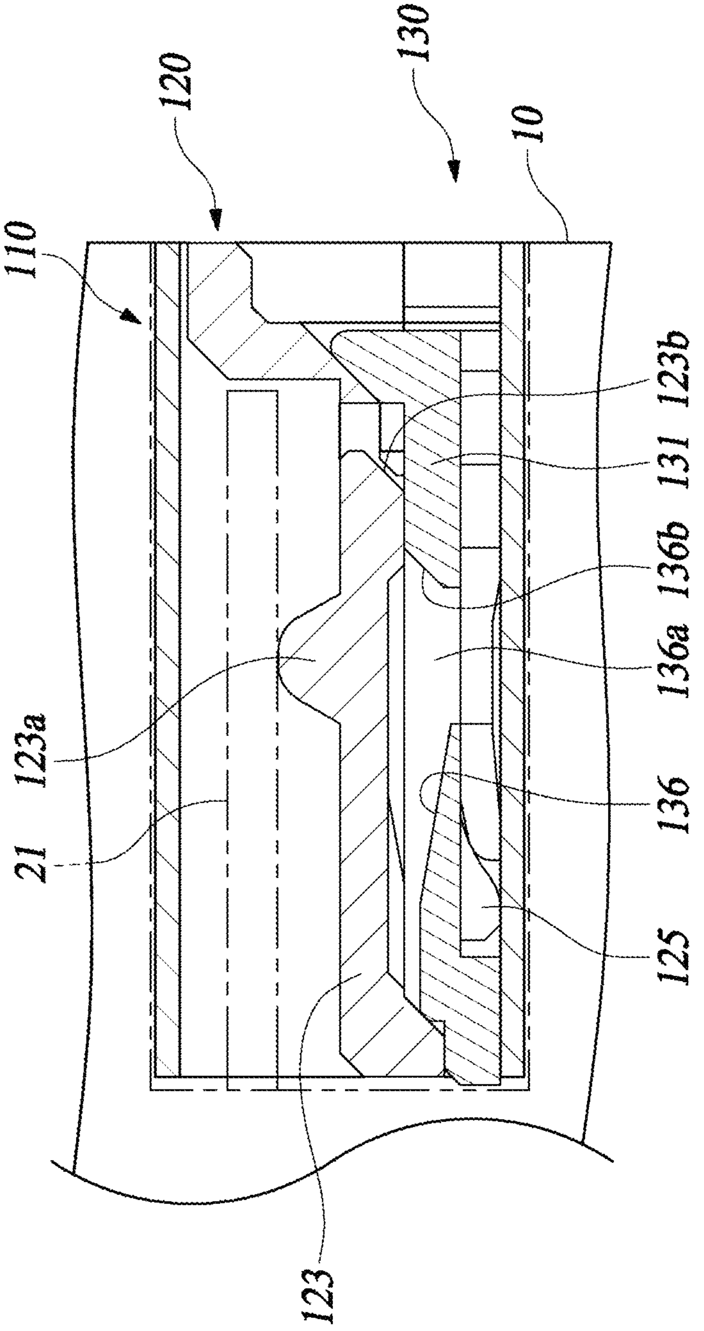
FIG. 14 is a sectional view taken along line V-V of FIG. 12.
Figure 15:
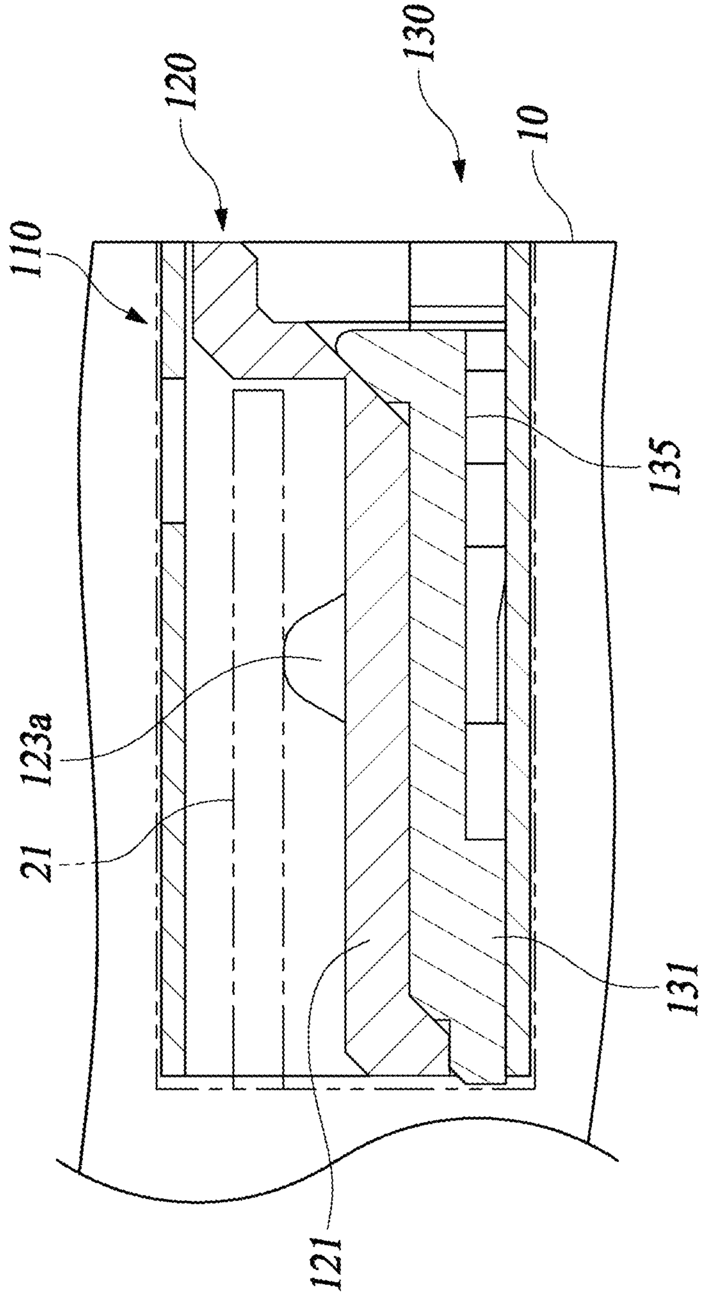
FIG. 15 is a sectional view taken along line VI-VI of FIG. 12.

In this state, the pattern module 130 protruding to the front end of the module frame 110 is pushed to the inside of the module frame 110. In this case, as illustrated in FIGS. 13 to 15, the pattern module 130 interferes with the first locking member 123 while moving to the locking position such that the first locking member 123 moves to the terminal part 21, and thus the interference protrusion 123*a* is in close contact with the terminal part 21 and holds the blocking module 100 such that the blocking module 100 is not freely removed. In addition, the end of the second locking member 125 is held by the holding jaw 137*a* of the pattern module 130. In this case, the pattern module 130 is blocked from moving to an initial unlocking position and thus the blocking module 100 can be securely inserted into and fixed in the port 20, and the blocking module 100 cannot be taken out arbitrarily.

Meanwhile, as described above, in order to take out the blocking module 100 which is coupled to the port 20 and blocks the port 20, the unlocking key 200 may be used.

That is, when the main manipulation knob 253 in the state of FIG. 22 is pushed, the movable housing 220 protrudes from the front end of the main body casing 210 as illustrated in FIG. 23. In this state, when the main manipulation knob 253 is further pushed forward, the movable member 251 is moved and the latch key 240 is closed to be in close contact with the opposite sides of the pattern key 230 as illustrated in FIGS. 24 and 27.

Figure 24:
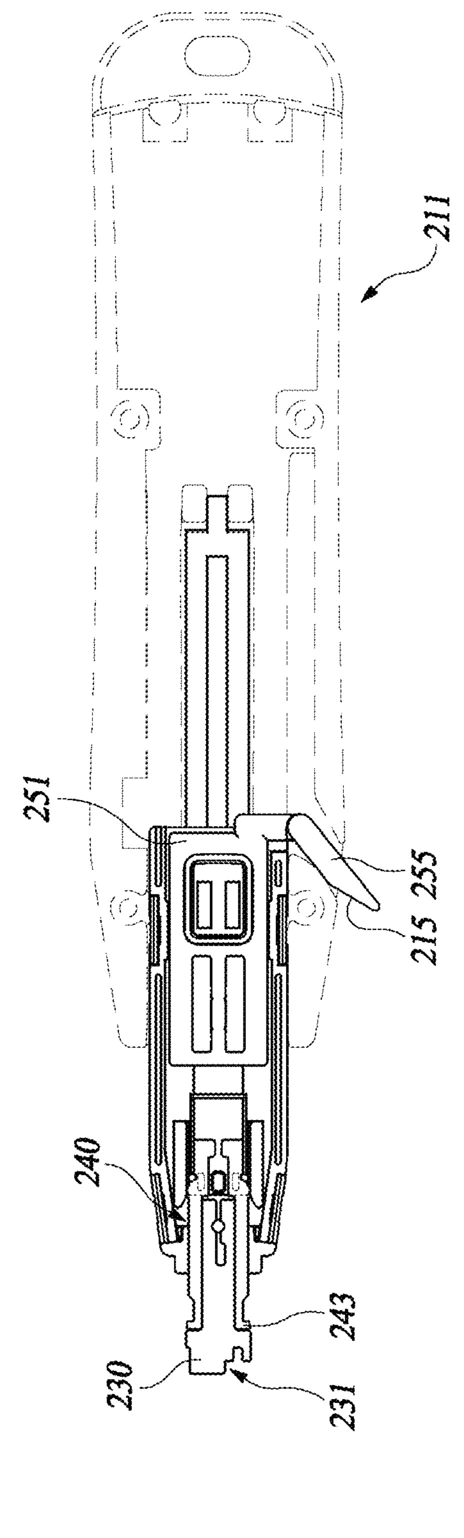
FIG. 24 is a top plan view illustrating a state in which the latch key is narrowed by moving a movable member from the state of FIG. 21.
Figure 25:
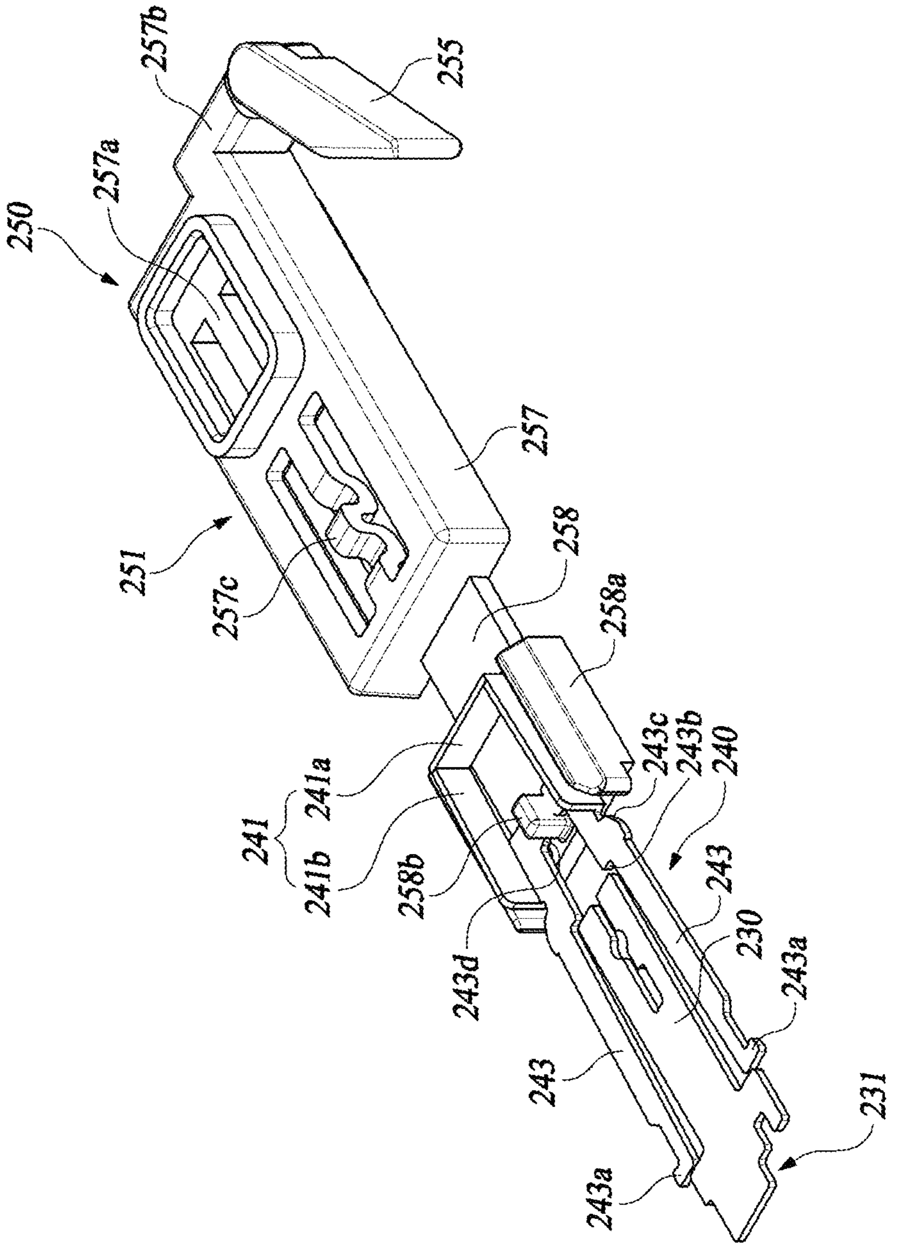
FIG. 25 is a perspective view illustrating a state in which a manipulation part, the pattern key, and the latch key illustrated in FIG. 19 are coupled to each other.
Figure 29:
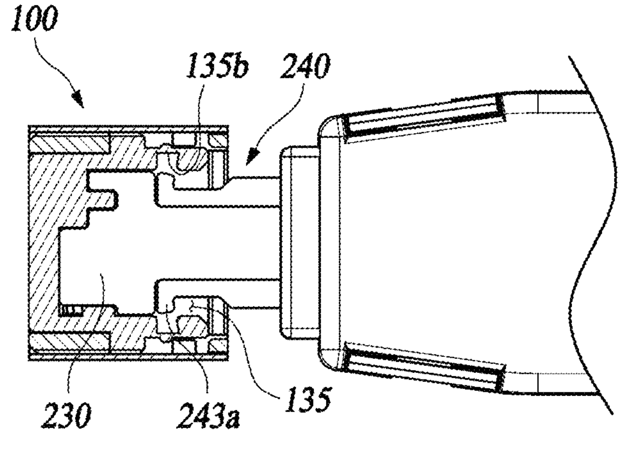
FIG. 29 is a bottom view illustrating a state in which the unlocking key is inserted into the key recess of the blocking module.

In the state of FIG. 24, the pattern key 230 and the latch key 240 are inserted into the key recess 135 of the blocking module 100. In this case, as illustrated in FIGS. 9 and 29, the pattern key 230 is inserted into the key recess 135, and when the pattern of the front end of the pattern key 230 and the pattern part 135*a* of the key recess 135 match each other, the pattern key 230 can be completely inserted into the key recess 135.

When the pattern key 230 is completely inserted, as illustrated in FIG. 9, the pattern key 230 pushes the second locking member 125 to be removed from the holding jaw 137*a*.

Figure 21:
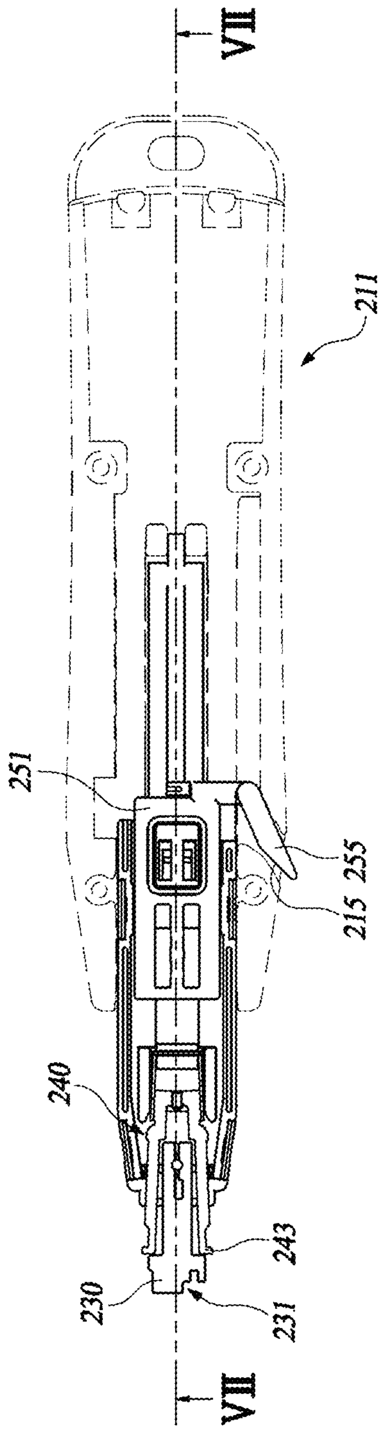
FIG. 21 is a top plan view illustrating a state in which an upper casing is removed from the unlocking key in FIG. 18.

In this state, the movable member 251 is moved backward by a predetermined distance by pushing the main manipulation knob 253 or the sub manipulation knob 255 of the unlocking key 200. In this case, while the movable member 251 moves backward, the latch key 240 is opened as illustrated in FIGS. 21 and 26. In this case, as illustrated in FIG. 30, the holding protrusion 243*a* is held in the latch key holding recess 135*b* inside the key recess 135.

Figure 31:
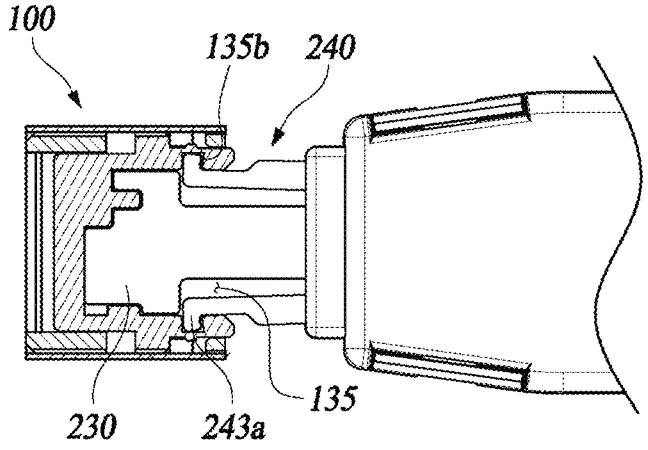
FIG. 31 is a bottom view illustrating a state in which the pattern module is moved to the unlocking position by using the unlocking key in the state of FIG. 30.

In this case, when the unlocking key 200 in the state of FIG. 30 is pulled, the: n module 130 is pulled out a predetermined distance and is moved to the unlocking position as illustrated in FIG. 31. In this case, as illustrated in FIGS. 9 and 10, the first locking member 123 is elastically restored to an initial position thereof, and the interference protrusion 123*a* is removed from the terminal part 21 of the port 20 and is unlocked. In this case, when the unlocking key 200 is further pulled, the blocking module 100 can be naturally removed from the port 20.

As described above, according to the present disclosure, the blocking module 100 can be inserted into the port 20 to easily lock the port 20 such that the port 20 can be securely blocked.

In addition, in order to unlock the port 20, only the unlocking key 200 having the pattern key 230 having a pattern corresponding to the pattern part 135*a* inside the key recess 135 of the pattern module 130 is required to be used so as to remove the blocking module 100, thereby improving security.

Particularly, the pattern key 230 and the latch key 240 operate individually, and the function of the latch key 240 is influenced by the shape of the pattern of the pattern key 230, and thus the blocking module 100 cannot be removed from the port 20 by unauthorized unlocking key 200. In addition, it is possible to fundamentally prevent the forcible removal of the blocking module 100 from the port 20 by using an unauthorized tool such as a clip or tweezers, thereby improving security.

In the above, the present disclosure has been illustrated and described in relation to the exemplary embodiment for illustrating the principle of the present disclosure, but the present disclosure is not limited to the configuration and operation as shown and described as such. Rather, it will be appreciated by those skilled in the art that many changes and modifications to the present disclosure are possible without departing from the spirit and scope of the appended claims.

The invention claimed is:

1. A port blocking module of an electronic device, the port blocking module comprising:

a module frame which is formed to correspond to size and shape of a port of an electronic device and has a shape of a frame having opposite open ends;

a locking module having a locking module body fixedly installed inside the module frame, a first locking member connected to the locking module body to be elastically transformable such that the first locking member selectively comes into contact with a terminal part inside the port, and a second locking member connected to the locking module body to be elastically transformable such that the second locking member is disposed by being spaced apart from the first locking member; and a pattern module which is installed to be movable between a locking position and an unlocking position inside and outside the module frame, the pattern module being configured to interfere with the first locking member such that the first locking member is in close contact with the terminal part and to be lock-coupled to the second locking member when the pattern module is inserted into the locking position, and having a key recess into which an unlocking key for separating the second locking member is inserted.

2. The port blocking module of claim 1, wherein the locking module body comprises:

a horizontal part which is located between an upper wall and a lower wall of the module frame, has a fixing recess formed in each of opposite sides of the horizontal part such that a fixing protrusion formed on the module frame is coupled to the fixing recess, and has a through hole formed in a center of the horizontal part such that each of the first and second locking members is received in the through hole by being connected to the horizontal part such that the first and second locking members are elastically transformable;

an entrance blocking part which is formed by extending upward from a front end of the horizontal part and partially blocks an entrance of the module frame; and a guide rib which is formed on each of opposite edges of the horizontal part by protruding downward therefrom and has a guide recess which limits a reciprocating distance of the pattern module.

3. The port blocking module of claim 1, wherein the pattern module comprises:

a plate-shaped pattern module body formed such that the key recess is exposed to a front surface and a lower surface of the pattern module body; and a guide protrusion formed on each of opposite side edges of the pattern module body by protruding therefrom, and wherein a pattern part to which a pattern key of the unlocking key is coupled and a latch key holding recess to which a latch key of the unlocking key is coupled are formed respectively on inner surfaces different from each other inside the key recess.

4. The port blocking module of claim 2, wherein the first locking member is formed to be inclined toward the pattern module from an end thereof, which is connected to an inner wall of the through hole, to a free end thereof; a guide surface is formed on the free end of the first locking member such that the guide surface is in contact with and is pressed by the pattern module moving to the locking position; and an interference protrusion is formed on an upper surface of the first locking member by protruding therefrom such that the interference protrusion is in close contact with the terminal part of the port when the first locking member is elastically transformed by interfering with the pattern module.

5. The port blocking module of claim 2, wherein the second locking member is formed to be inclined toward the pattern module from a first end of the second locking member, which is connected to an inner wall of the through hole, to a second end thereof, and the second end of the second locking member extends by protruding toward a lower part of the locking module body such that the second end of the second locking member is held by a holding jaw formed on the pattern module moving to the locking position.

6. The port blocking module of claim 3, wherein the pattern module body comprises:

a first receiving recess which is formed to be deeper gradually toward a front end of the pattern module body on an upper surface thereof such that the first locking member of the locking module is received in the first receiving recess;

a first through hole formed at an end of the first receiving recess such that the first through hole communicates with the key recess;

a second receiving recess which is formed to be deeper gradually toward a rear end of the pattern module body on the upper surface thereof such that the second locking member of the locking module is received in the second receiving recess;

a holding jaw which is formed on an end of the second receiving recess such that an end of the second locking member is held by the holding jaw; and a second through hole which is formed to communicate with the key recess while sharing the holding jaw.

7. A port locking apparatus of an electronic device, the apparatus comprising:

the blocking module of claim 1; and the unlocking key having the pattern key which is inserted into the key recess by protruding from a front end of an unlocking key body and interferes with the second locking member such that the pattern module is separated from the second locking member to be unlocked from the locking module, and the latch key which is installed movably outside the pattern key and extends inside the key recess to be held in the key recess such that the pattern module is able to be moved to the unlocking position.

8. The apparatus of claim 7, wherein a pattern corresponding to the pattern part formed on an inner wall of the key recess is formed on a front end of the pattern key.

9. The apparatus of claim 7, wherein the latch key holding recess in which the latch key is held is formed in each of opposite side wall surfaces of the inside of the key recess.

* * * * *